United States Patent
Waldman et al.

(10) Patent No.: US 12,012,559 B2
(45) Date of Patent: Jun. 18, 2024

(54) JANUS MEMBRANES VIA ATOMIC LAYER DEPOSITION

(71) Applicant: UCHICAGO ARGONNE, LLC, Chicago, IL (US)

(72) Inventors: Ruben Waldman, Chicago, IL (US); Hao-Cheng Yang, Westmont, IL (US); Seth B. Darling, Chicago, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 0 days.

(21) Appl. No.: 15/977,831

(22) Filed: May 11, 2018

(65) Prior Publication Data

US 2019/0345397 A1    Nov. 14, 2019

(51) Int. Cl.
*C10G 33/06*    (2006.01)
*C01B 32/168*    (2017.01)
*C02F 101/32*    (2006.01)

(52) U.S. Cl.
CPC ............ *C10G 33/06* (2013.01); *C01B 32/168* (2017.08); *C02F 2101/325* (2013.01); *C02F 2305/08* (2013.01)

(58) Field of Classification Search
CPC ... C10G 33/06; C01B 32/168; C02F 2305/08; C02F 2101/325
USPC .............................. 427/248.1–255.7
See application file for complete search history.

(56) References Cited

U.S. PATENT DOCUMENTS

| | | | |
|---|---|---|---|
| 3,617,552 A | 11/1971 | Will et al. | |
| 4,744,889 A | 5/1988 | Kruyer | |
| 4,889,542 A | 12/1989 | Hayes | |
| 5,133,881 A | 7/1992 | Miller et al. | |
| 5,645,733 A | 7/1997 | Hobson | |
| 5,973,068 A | 10/1999 | Yamaya et al. | |
| 6,326,326 B1 | 12/2001 | Feng et al. | |
| 6,723,595 B2 * | 4/2004 | Park | C23C 16/4401 438/216 |
| 8,980,418 B2 | 3/2015 | Darling et al. | |
| 9,103,086 B2 | 8/2015 | Cantrell et al. | |
| 9,719,226 B2 | 8/2017 | Riedel | |
| 2002/0005360 A1 | 1/2002 | Haug et al. | |
| 2002/0043216 A1 * | 4/2002 | Hwang | C23C 16/45525 118/723 VE |
| 2002/0144595 A1 | 10/2002 | Wang et al. | |

(Continued)

FOREIGN PATENT DOCUMENTS

| | | |
|---|---|---|
| WO | WO-2006/033924 | 3/2006 |
| WO | WO-2011/138583 A1 | 11/2011 |
| WO | WO-2015/076438 A1 | 5/2015 |

OTHER PUBLICATIONS

Kowalik ("Extra-Low Temperature Growth of ZnO by Atomic Layer Deposition with Diethylzinc Precursor", Acta Physica Polonica A, vol. 112 (2007) No. 2, 401-406) (Year: 2007).*

(Continued)

*Primary Examiner* — Michael G Miller
(74) *Attorney, Agent, or Firm* — Foley & Lardner LLP

(57) ABSTRACT

A Janus membrane exhibiting sides with different properties and methods of fabricating such a Janus membrane. The membrane comprises a polymer material lacking polar functional groups. One side of the membrane is masked during atomic layer deposition (ALD). ALD is utilized to deposit a conformal coating on an exposed side of the membrane.

14 Claims, 21 Drawing Sheets

(56) References Cited

U.S. PATENT DOCUMENTS

| | | |
|---|---|---|
| 2003/0082412 A1 | 5/2003 | Fukuda et al. |
| 2005/0081907 A1 | 4/2005 | Lewis et al. |
| 2006/0048938 A1 | 3/2006 | Kalman |
| 2006/0088666 A1 | 4/2006 | Kobrin et al. |
| 2008/0073288 A1 | 3/2008 | Fan et al. |
| 2008/0107809 A1 | 5/2008 | Wu et al. |
| 2008/0286448 A1 | 11/2008 | Elam et al. |
| 2009/0111703 A1 | 4/2009 | Gopalan |
| 2009/0297868 A1 | 12/2009 | Ito et al. |
| 2009/0304920 A1* | 12/2009 | Elam .............. B01J 35/065 427/212 |
| 2010/0003406 A1 | 1/2010 | Lam et al. |
| 2010/0080903 A1 | 4/2010 | Tamitsuji et al. |
| 2011/0042301 A1* | 2/2011 | Zhang .............. B01D 69/10 210/500.21 |
| 2011/0056886 A1 | 3/2011 | De Luca |
| 2011/0168454 A1 | 7/2011 | Keshavan et al. |
| 2012/0046421 A1 | 2/2012 | Darling et al. |
| 2012/0171403 A1 | 7/2012 | Dodge |
| 2013/0059123 A1 | 3/2013 | Wang et al. |
| 2013/0095996 A1 | 4/2013 | Buelow et al. |
| 2014/0370259 A1 | 12/2014 | Edwards et al. |
| 2014/0371060 A1 | 12/2014 | Smith et al. |
| 2017/0025658 A1* | 1/2017 | Shi .............. B05D 1/62 |
| 2017/0157534 A1 | 6/2017 | Curtis et al. |
| 2017/0166456 A1 | 6/2017 | Darling et al. |
| 2017/0304778 A1 | 10/2017 | Ye et al. |
| 2020/0062600 A1 | 2/2020 | Kidambi et al. |

OTHER PUBLICATIONS

Afshar ("Growth mechanism of atomic layer deposition of zinc oxide: A density functional theory approach", Afshar et al, Appl. Phys. Lett. 103, 251906 (2013); https://doi.org/10.1063/1.4852655 Submitted: May 28, 2013 . Accepted: Dec. 3, 2013. Published Online: Dec. 18, 2013.) (Year: 2013).*
Ferguson ("Atomic Layer Deposition of Al2O3 Films on Polyethylene Particles", Ferguson et al, Chem. Mater. 2004, 16, 5602-5609, accessed online Mar. 11, 2023) (Year: 2004).*
Barry, et al., "Advanced oil sorbents using sequential infiltration synthesis," Journal of Materials Chemistry A 5, pp. 2929-2935 (2017).
Bico, et al., "Wetting of textured surfaces," Colloids and Surfaces A: Physicochemical and Engineering Aspects 206(1-3), pp. 41-46 (2002).
Bobji, et al., "Underwater sustainability of the 'Cassie' state of wetting," Langmuir 25(20), pp. 12120-12126 (2009).
Cao, et al., "Hydrophobic/Hydrophilic Cooperative Janus System for Enhancement of Fog Collection," Small 11(34), pp. 4379-4384 (2015).
Chen, et al., "Enhancing the hydrophilicity and water permeability of polypropylene membranes by nitric acid activation and metal oxide deposition," Journal of Membrane Science 487, pp. 109-116 (2015).
Dillon, et al., "Surface chemistry of Al2O3 deposition using Al(CH3)3 and H2O in a binary reaction sequence," Surface Science 322 (1-3), pp. 230-242 (1995).
Dorrer & Ruhe, "Superaerophobicity: Repellence of air bubbles from submerged, surface-engineered silicon substrates," Langmuir 28(42), pp. 14968-14973 (2012).
Elam, et al., "Conformal coating on ultrahigh-aspect-ratio nanopores of anodic alumina by atomic layer deposition," Chemistry of Materials 15(18), pp. 3507-3517 (2003).
Elam, et al., "Spatially controlled atomic layer deposition in porous materials," Applied Physics Letters 91, pp. 177-184 (2007).
Hou, et al., "Biocatalytic Janus membranes for CO2 removal utilizing carbonic anhydrase," Journal of Materials Chemistry A 3, pp. 17032-17041 (2015).
Hu, et al,. "An ultrathin bilayer membrane with asymmetric wettability for pressure responsive oil/water emulsion separation," J. Mater. Chem. A, 3, pp. 23477-23482 (2015).

Huang, et al., "Novel Janus Membrane for Membrane Distillation with Simultaneous Fouling and Wetting Resistance," Environmental Science & Technology 51(22), pp. 13304-13310 (2017).
Jung, et al., "Improved functionality of lithium-ion batteries enabled by atomic layer deposition on the porous microstructure of polymer separators and coating electrodes," Advanced Energy Materials 2(8), pp. 1022-1027 (2012).
Jur, et al., "Temperature-dependent subsurface growth during atomic layer deposition on polypropylene and cellulose fibers," Langmuir 26(11), pp. 8239-8244 (2010).
Lam, et al., "A Chemically Patterned Microfluidic Paper-based Analytical Device (C-uPAD) for Point-of-Care Diagnostics," Scientific Reports 7, 1188, 10 pages (2017).
Lee, et al., "Conformal Nitrogen-Doped TiO2 Photocatalytic Coatings for Sunlight-Activated Membranes," Advanced Sustainable Systems 1(1-2), 1600041, 23 pages (2017).
Lee, et al., "Nanofluidic transport governed by the liquid/vapour interface," Nature Nanotechnology 9, pp. 317-323 (2014).
Li, et al., "Modification of ceramic membranes for pore structure tailoring: The atomic layer deposition route," Journal of Membrane Science 397-398, pp. 17-23 (2012).
Li, et al., "Precise pore size tuning and surface modifications of polymeric membranes using the atomic layer deposition technique," Journal of Membrane Science 385-386, pp. 1-9 (2011).
Li, et al., "Under-Water Superaerophobic Pine-Shaped Pt Nanoarray Electrode for Ultrahigh-Performance Hydrogen Evolution," Advanced Functional Materials 25(11), pp. 1737-1744 (2015).
Oh, et al., "Janus-Faced, Dual-Conductive/Chemically Active Battery Separator Membranes," Advanced Functional Materials 26(39), pp. 7074-7083 (2016).
Ozkaya, et al., "Combined in situ XPS and UHV-chemical force microscopy (CFM) studies of the plasma induced surface oxidation of polypropylene," Plasma Processes and Polymers 11(3), pp. 256-262 (2014).
Parsons, et al., "Mechanisms and reactions during atomic layer deposition on polymers," Coordination Chemistry Reviews 257 (23-24), pp. 3323-3331 (2013).
Peng, et al., "Janus separator of polypropylene-supported cellular graphene framework for sulfur cathodes with high utilization in lithium-sulfur batteries," Advanced Science 3(1), pp. 1-11 (2015).
Pi, et al., "Polypropylene microfiltration membranes modified with TiO2 nanoparticles for surface wettability and antifouling property," Journal of Membrane Science 500, pp. 8-15 (2016).
Ren, et al., "A single-layer Janus membrane with dual gradient conical micropore arrays for self-driving fog collection," Journal of Materials Chemistry A 5, pp. 18403-18408 (2017).
Sasaki, et al., "Asymmetric Superhydrophobic/Superhydrophilic Cotton Fabrics Designed by Spraying Polymer and Nanoparticles," ACS Applied Materials & Interfaces 8(1), pp. 651-659 (2016).
Tian, et al., "Droplet and Fluid Gating by Biomimetic Janus Membranes," Advanced Functional Materials 24(38), pp. 6023-6028 (2014).
Ueda, et al., "Effects of aeration on suction pressure in a submerged membrane bioreactor," Water Research 31(3), pp. 489-494 (1997).
Vaha-Nissi, et al., "Growth of thin Al2O3 films on biaxially oriented polymer films by atomic layer deposition," Thin Solid Films 522, pp. 50-57 (2012).
Wang, et al., "Directional water-transfer through fabrics induced by asymmetric wettability," Journal of Materials Chemistry 20, 7938 (2010).
Wang, et al., "Rapid and Efficient Separation of Oil from Oil-in-Water Emulsions Using a Janus Cotton Fabric," Angewandte Chemie International Edition 55(4), pp. 1291-1294 (2016).
Wang, et al., "Simply realizing 'water diode' Janus membranes for multifunctional smart applications," Materials Horizons 4, pp. 701-708 (2017).
Wang, et al., "Universal Janus Filters for the Rapid Separation of Oil from Emulsions Stabilized by Ionic or Nonionic Surfactants," Angewandte Chemie International Edition 56(42), pp. 12892-12897 (2017).
Wu, et al., "Janus Membranes with Opposing Surface Wettability Enabling Oil-to-Water and Water-to-Oil Emulsification," ACS Applied Materials & Interfaces 9(6), pp. 5062-5066 (2017).

(56) References Cited

OTHER PUBLICATIONS

Wu, et al., "Unidirectional water-penetration composite fibrous film via electrospinning," Soft Matter 8, 5996 (2012).
Xu, et al., "Hydrophilization of porous polypropylene membranes by atomic layer deposition of TiO2 for simultaneously improved permeability and selectivity," Journal of Membrane Science 448, pp. 215-222 (2013).
Yang, et al., "Janus hollow fiber membrane with a mussel-inspired coating on the lumen surface for direct contact membrane distillation," Journal of Membrane Science 523, pp. 1-7 (2017).
Yang, et al., "Janus Membranes with Asymmetric Wettability for Fine Bubble Aeration," Advanced Materials Interfaces 3(9), pp. 1-5 (2016).
Yang, et al., "Janus Membranes: Exploring Duality for Advanced Separation," Angewandte Chemie International Edition 55(43), pp. 13398-13407 (2016).
Yang, et al., "Mussel-inspired modification of a polymer membrane for ultra-high water permeability and oil-in-water emulsion separation," Journal of Materials Chemistry A 2, pp. 10225-10230 (2014).
Yang, et al., "Paper-Based Microfluidic Devices: Emerging Themes and Applications," Analytical Chemistry 89(1), pp. 71-91 (2017).
Zhang & Barboiu, "Dynameric asymmetric membranes for directional water transport," Chemical Communications 51, pp. 15925-15927 (2015).
Zhang, et al., "Biomimetic multifunctional nanochannels based on the asymmetric wettability of heterogeneous nanowire membranes," Advanced Materials 26(7), pp. 1071-1075 (2014).
Zhang, et al., "Mineralized growth of Janus membrane with asymmetric wetting property for fast separation of a trace of blood," Journal of Materials Chemistry B 5, pp. 4876-4882 (2017).
Zhao, et al., "Directional Fluid Transport in Thin Porous Materials and its Functional Applications," Small 13(4), pp. 1-22 (2017).
Zheng & Yapa, "Buoyant Velocity of Spherical and Nonspherical Bubbles/Droplets," Journal of Hydraulic Engineering 126(11), pp. 852-854 (2000).
Zhou, et al., "Superphobicity/philicity janus fabrics with switchable, spontaneous, directional transport ability to water and oil fluids," Sci. Rep., 3, pp. 1-6 (2013).
Buluswar, et al., "50 Breakthroughs: Critical scientific and technological advances needed for sustainable global development," Institute for Transformative Technologies, Lawrence Berkeley National Lab., 22 pages (2014).
Calcagnile, et al., "Magnetically Driven Floating Foams for the Removal of Oil Contaminants from Water," ACS Nano 6(6), pp. 5413-5419 (2012).
Chen & Xu, "Mineral-Coated Polymer Membranes with Superhydrophilicity and Underwater Superoleophobicity for Effective Oil/Water Separation," Scientific Reports 3, 2776, 6 pages (2013).
Chen, et al., "Bio-inspired CaCO3 coating for superhydrophilic hybrid membranes with high water permeability," Journal of Materials Chemistry 22, pp. 22727-22733 (2012).
Cheryan & Rajagopalan, "Membrane processing of oily streams. Wastewater treatment and waste reduction," Journal of Membrane Science 151(1), pp. 13-28 (1998).
Choi, et al., "Effects of substrate conductivity on cell morphogenesis and proliferation using tailored, atomic layer deposition-grown ZnO thin films," Scientific Reports 5, 9974, 9 pages (2015).
Dudchenko, et al., "Coupling Underwater Superoleophobic Membranes with Magnetic Pickering Emulsions for Fouling-Free Separation of Crude Oil/Water Mixtures: An Experimental and Theoretical Study," ACS Nano 9(10), pp. 9930-9941 (2015).
Fabreguette, et al., "Quartz crystal microbalance study of tungsten atomic layer deposition using WF6 and Si2H6," Thin Solid Films 488(1-2), pp. 103-110 (2005).
Fakhru'l-Razi, et al., "Review of technologies for oil and gas produced water treatment," Journal of Hazardous Materials 170(2-3), pp. 530-551 (2009).

Frackowiak & Beguin, "Carbon materials for the electrochemical storage of energy in capacitors," Carbon 39(6), pp. 937-950 (2011).
Gao, et al., "A Robust Polyionized Hydrogel with an Unprecedented Underwater Anti-Crude-Oil-Adhesion Property," Advanced Materials 28(26), pp. 5307-5314 (2016).
Ge, et al., "Pumping through Porous Hydrophobic/Oleophilic Materials: An Alternative Technology for Oil Spill Remediation," Angewandte Chemie 53(14), pp. 3612-3616 (2014).
George, "Atomic layer deposition: an overview," Chemical Reviews 110(1), pp. 111-131 (2010).
Guo, et al., "Robust Underwater Oil-Repellent Material Inspired by Columnar Nacre," Advanced Materials 28(38), pp. 8505-8510 (2016).
Hall, et al., "Energy storage in electrochemical capacitors: designing functional materials to improve performance," Energy & Environmental Science 3, pp. 1238-1251 (2010).
Hao, et al., "Oxygen Vacancies Lead to Loss of Domain Order, Particle Fracture, and Rapid Capacity Fade in Lithium Manganospinel (LiMn2O4) Batteries," ACS Applied Materials & Interfaces 6(14), pp. 10849-10857 (2014).
Huang & Wang, "A Simple Nanocellulose Coating for Self-Cleaning upon Water Action: Molecular Design of Stable Surface Hydrophilicity," Angewandte Chemie International Edition 56(31), pp. 9053-9057 (2017).
International Search Report and Written Opinion for PCT/US2017/041223 dated Sep. 28, 2017, 8 pages.
Janotti & Van De Walle, "Fundamentals of zinc oxide as a semiconductor," Reports on Progress in Physics 72(12), 29 pages (2009).
Keshavarz, et al., "Enhancing oil removal from water by immobilizing multi-wall carbon nanotubes on the surface of polyurethane foam," Journal of Environmental Management 157, pp. 279-286 (2015).
Kim, et al., "A development of high power activated carbon using the KOH activation of soft carbon series cokes," Transactions on Electrical and Electronic Materials 15(2), pp. 81-86 (2014).
Kota, et al., "Hygro-responsive membranes for effective oil-water separation," Nature Communications 3, 1025, 8 pages (2012).
Kota, et al., "The design and applications of superomniphobic surfaces," NPG Asia Materials 6, e109, 16 pages (2014).
Lee, et al., "An Alternative Route Towards Metal-Polymer Hybrid Materials Prepared by Vapor-Phase Processing," Advanced Functional Materials 21(16), pp. 3047-3055 (2011).
Lee, et al., "Membrane materials for water purification: design, development, and application," Environmental Science: Water Research & Technology 2, pp. 17-42 (2016).
Liu, et al., "Clam's Shell Inspired High-Energy Inorganic Coatings with Underwater Low Adhesive Superoleophobicity," Advanced Materials 24(25), pp. 3401-3405 (2012).
MacDiarmid, et al., "Polyaniline: a new concept in conducting polymers," Synthetic Metals 18(1-3), pp. 285-290 (1987).
McNeill, et al., "Electronic Conduction in Polymers. I. The Chemical Structure of Polypyrrole," Australian Journal of Chemistry 16(6), pp. 1056-1075 (1963).
Naveen, et al., "Applications of conducting polymer composites to electrochemical sensors: A review," Applied Materials Today 9, pp. 419-433 (2017).
Pasta, et al., "A Desalination Battery," Nano Letters 12(2), pp. 839-843 (2012).
Peng, et al., "Theoretical specific capacitance based on charge storage mechanisms of conducting polymers: Comment on 'Vertically oriented arrays of polyaniline nanorods and their super electrochemical properties'," Chemical Communications 47, pp. 4105-4107 (2011).
Porada, et al., "Review on the science and technology of water desalination by capacitive deionization," Progress in Materials Science 58(8), pp. 1388-1442 (2013).
Remillard, et al., "A direct comparison of flow-by and flow-through capacitive deionization," Desalination 444, pp. 169-177 (2018).
Simon & Gogotsi, "Materials for electrochemical capacitors," Nature Materials 7, pp. 845-854 (2008).
Song, et al., "Anomalous Pseudocapacitive Behavior of a Nanostructured, Mixed-Valent Manganese Oxide Film for Electrical Energy Storage," Nano Letters 12(7), pp. 3483-3490 (2012).

(56) References Cited

OTHER PUBLICATIONS

Steele, et al., "Inherently Superoleophobic Nanocomposite Coatings by Spray Atomization," Nano Letters 9(1), pp. 501-505 (2009).
Sugimoto, et al., "Charge storage mechanism of nanostructured anhydrous and hydrous ruthenium-based oxides," Electrochimica Acta 52(4), pp. 1742-1748 (2006).
Sugimoto, et al., "Preparation of Ruthenic Acid Nanosheets and Utilization of its Interlayer Surface for Electrochemical Energy Storage," Angewandte Chemie International Edition 42(34), pp. 4092-4096 (2003).
Suss, et al., "Water desalination via capacitive deionization: what is it and what can we expect from it," Energy & Environmental Science 8, pp. 2296-2319 (2015).
Tao, et al., "An Intelligent Superwetting PVDF Membrane Showing Switchable Transport Performance for Oil/Water Separation," Advanced Materials 26(18), pp. 2943-2948 (2014).
Toupin, et al., "Charge Storage Mechanism of $MnO_2$ Electrode Used in Aqueous Electrochemical Capacitor," Chemistry of Materials 16(16), pp. 3184-3190 (2004).
Wang, et al., "Extremely Efficient and Recyclable Absorbents for Oily Pollutants Enabled by Ultrathin-Layered Functionalization," ACS Applied Materials & Interfaces 6(21), pp. 18816-18823 (2014).
Wang, et al., "PVDF membranes with simultaneously enhanced permeability and selectivity by breaking the tradeoff effect via atomic layer deposition of $TiO_2$," Journal of Membrane Science 442, pp. 57-64 (2013).
Wen, et al., "Zeolite-coated mesh film for efficient oil-water separation," Chemical Science 4, pp. 591-595 (2013).
Xu, et al., "Atomic layer deposition of alumina on porous polytetrafluoroethylene membranes for enhanced hydrophilicity and separation performances," Journal of Membrane Science 415-416, pp. 435-443 (2012).
Xue, et al., "A Novel Superhydrophilic and Underwater Superoleophobic Hydrogel-Coated Mesh for Oil/Water Separation," Advanced Materials 23(37), pp. 4270-4273 (2011).
Yang, et al., "Polymer membrane with a mineral coating for enhanced curling resistance and surface wettability," Chemical Communications 51, pp. 12779-12782 (2015).
Yang, et al., "Silica-Decorated Polypropylene Microfiltration Membranes with a Mussel-Inspired Intermediate Layer for Oil-in-Water Emulsion Separation," ACS Applied Materials & Interfaces 6(15), pp. 12566-12572 (2014).
Yang, et al., "Surface and interface engineering for organic-inorganic composite membranes," Journal of Materials Chemistry A 4(25), pp. 9716-9729 (2016).
Zang, et al., "Well-Aligned Cone-Shaped Nanostructure of Polypyrrole/$RuO_2$ and its Electrochemical Supercapacitor," The Journal of Physical Chemistry C 112(38), pp. 14843-14847 (2008).
Zhang, et al., "Cupric Phosphate Nanosheets-Wrapped Inorganic Membranes with Superhydrophilic and Outstanding Anticrude Oil-Fouling Property for Oil/Water Separation," ACS Nano 12(1), pp. 795-803 (2018).
Zhang, et al., "Nanowire-Haired Inorganic Membranes with Superhydrophilicity and Underwater Ultralow Adhesive Superoleophobicity for High-Efficiency Oil/Water Separation," Advanced Materials 25(30), pp. 4192-4198 (2013).
Zhang, et al., "Salt-Induced Fabrication of Superhydrophilic and Underwater Superoleophobic PAA-g-PVDF Membranes for Effective Separation of Oil-in-Water Emulsions," Angewandte Chemie International Edition 53(3), pp. 856-860 (2014).
Zhang, et al., "Superhydrophobic and Superoleophilic PVDF Membranes for Effective Separation of Water-in-Oil Emulsions with High Flux," Advanced Materials 25(14), pp. 2071-2076 (2013).
"Oleo Sponge," Argonne National Laboratory, 1 page (2018).
Final Office Action on U.S. Appl. No. 14/967,021 dated Oct. 26, 2018.
Final Office Action on U.S. Appl. No. 15/644,569 dated Jun. 1, 2020.
Final Office Action on U.S. Appl. No. 15/644,569 dated Jul. 22, 2019.
Final Office Action on U.S. Appl. No. 15/680,064 dated Aug. 21, 2019.
Final Office Action on U.S. Appl. No. 15/680,064 dated Oct. 13, 2021.
Final Office Action on U.S. Appl. No. 15/680,064 dated Oct. 14, 2020.
Final Office Action on U.S. Appl. No. 15/994,825 dated Apr. 26, 2021.
Final Office Action on U.S. Appl. No. 15/994,825 dated Jul. 14, 2020.
Final Office Action on U.S. Appl. No. 16/123,382 dated Jan. 15, 2020.
Non-Final Office Action on U.S. Appl. No. 14/967,021 dated Mar. 8, 2019.
Non-Final Office Action on U.S. Appl. No. 15/644,569 dated Jan. 11, 2019.
Non-Final Office Action on U.S. Appl. No. 15/644,569 dated Dec. 30, 2019.
Non-Final Office Action on U.S. Appl. No. 15/680,064 dated Jan. 10, 2019.
Non-Final Office Action on U.S. Appl. No. 15/680,064 dated Mar. 19, 2021.
Non-Final Office Action on U.S. Appl. No. 15/994,825 dated Mar. 3, 2020.
Non-Final Office Action on U.S. Appl. No. 16/123,382 dated Feb. 2, 2021.
Non-Final Office Action on U.S. Appl. No. 16/123,382 dated Apr. 9, 2019.
Notice of Allowance on U.S. Appl. No. 14/967,021 dated Jun. 26, 2019.
Notice of Allowance on U.S. Appl. No. 15/644,569 dated Aug. 31, 2020.
Notice of Allowance on U.S. Appl. No. 16/599,537 dated Nov. 25, 2020.
Notice of Allowance on U.S. Appl. No. 16/599,537 dated Dec. 11, 2020.
U.S. Notice of Allowance on U.S. Appl. No. 16/599,537 dated Feb. 23, 2021.
U.S. Office Action on U.S. Appl. No. 14/967,021 dated Apr. 19, 2018.
U.S. Office Action on U.S. Appl. No. 15/994,825 dated Nov. 18, 2020.
U.S. Office Action on U.S. Appl. No. 16/123,382 dated Aug. 24, 2021.

\* cited by examiner

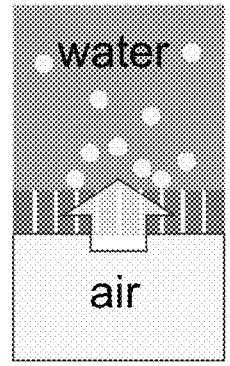
Fig. 5A
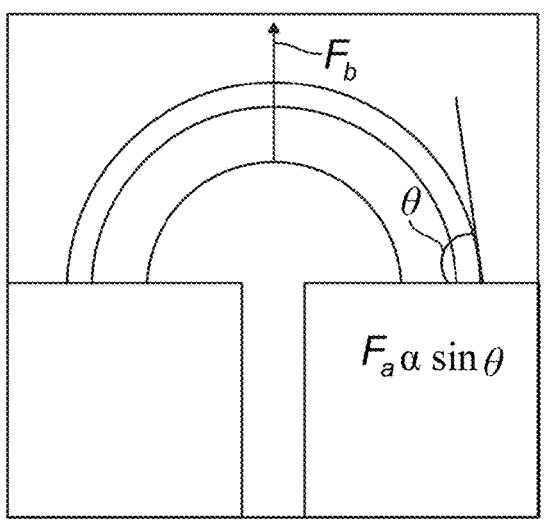
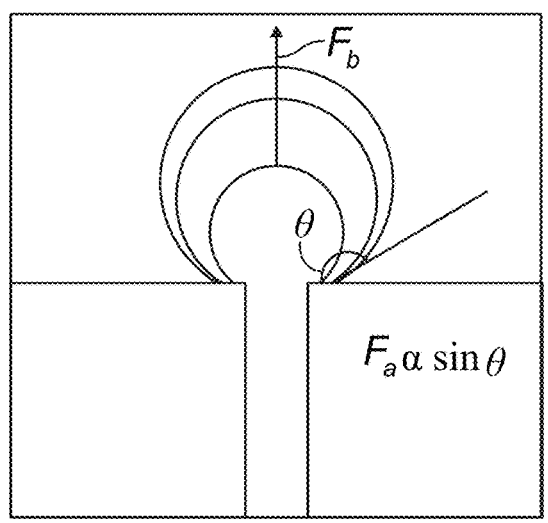
FIG. 5B  FIG. 5C

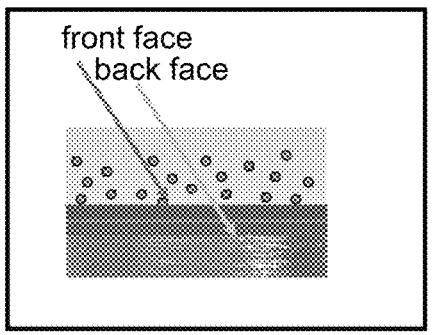 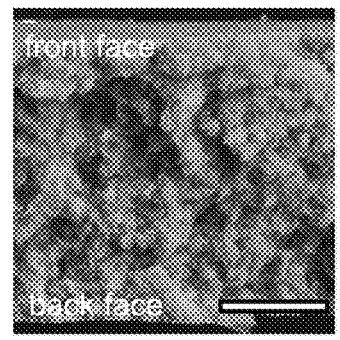
Fig. 7A                Fig. 7B
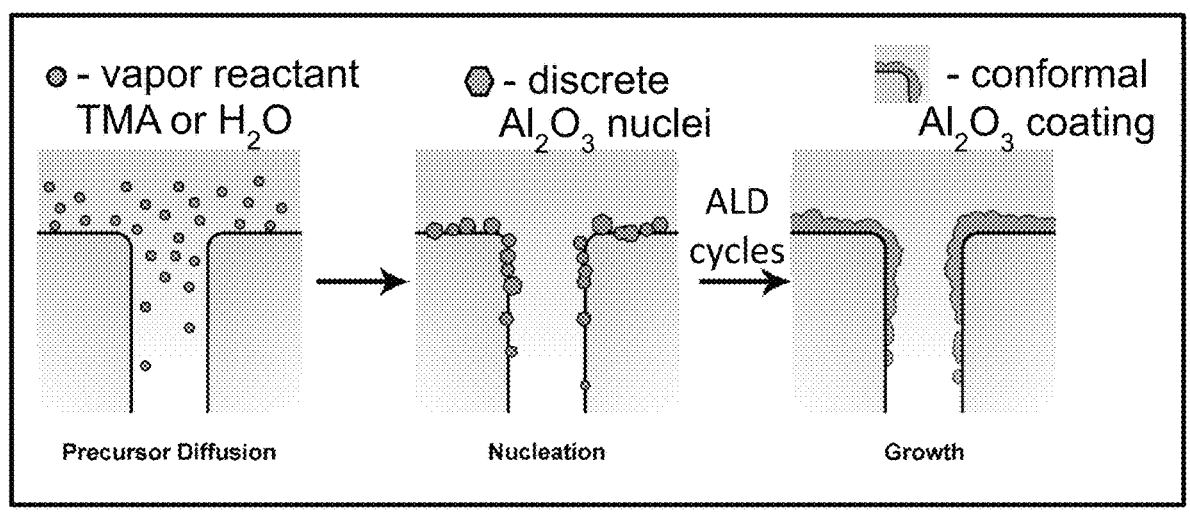
Fig. 7C

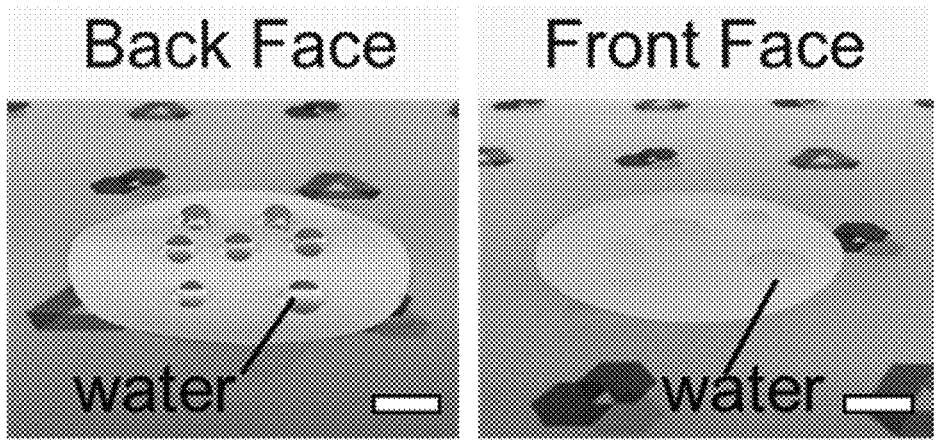
Fig. 12A    Fig. 12B
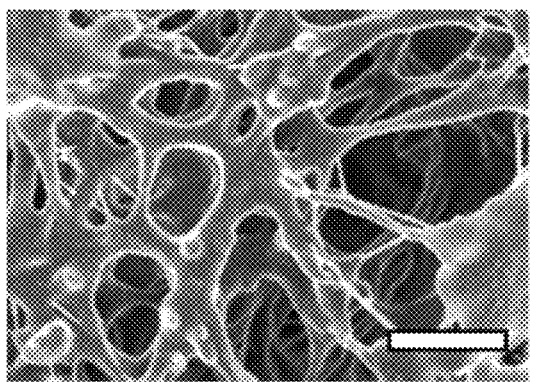 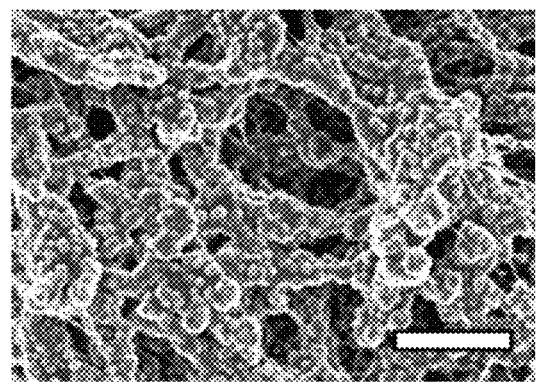
Fig. 12C    Fig. 12D
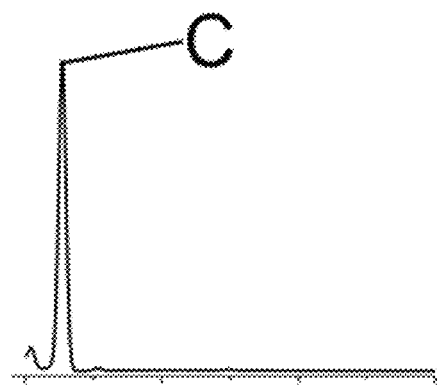 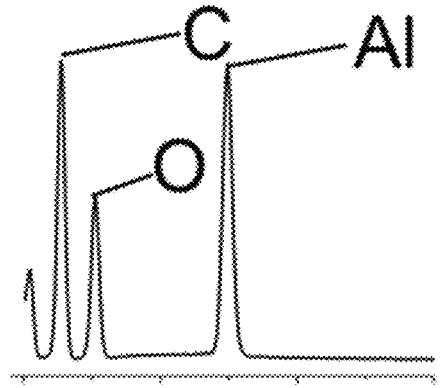
Fig. 12E    Fig. 12F top surface
cross-section
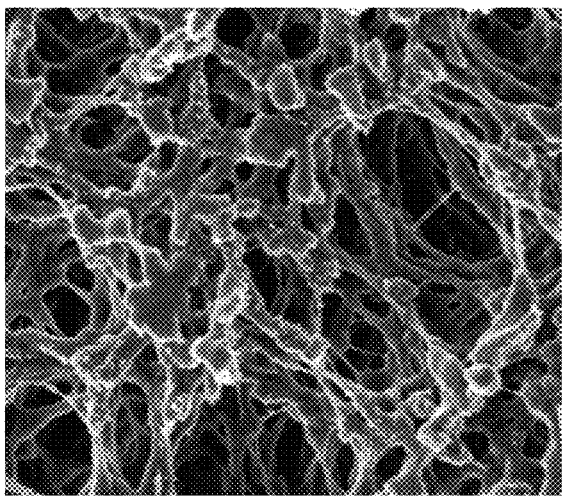
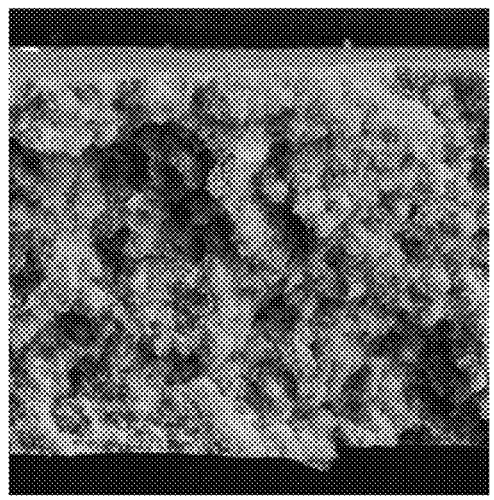
Fig. 13A
Fig. 13B
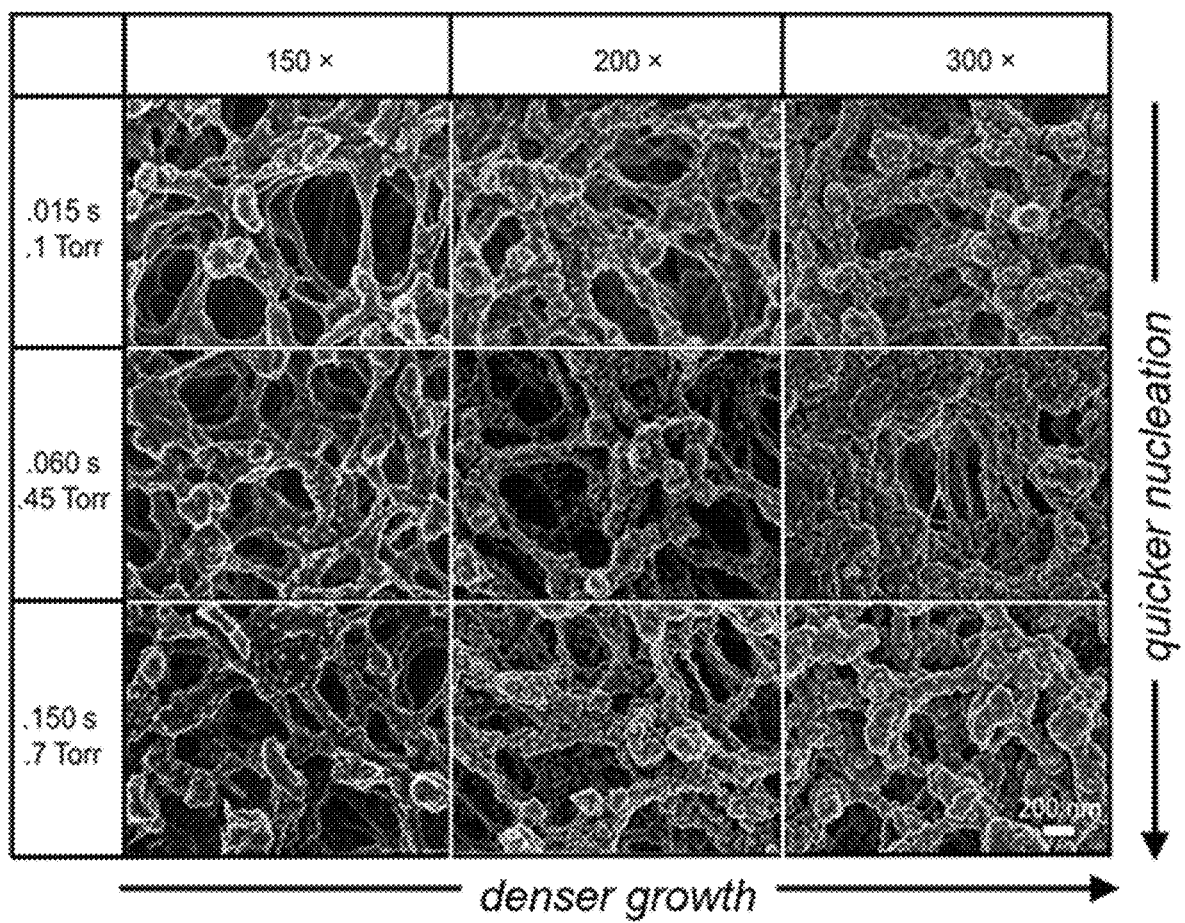
Fig. 13C

JANUS MEMBRANES VIA ATOMIC LAYER DEPOSITION

The United States Government claims certain rights in this invention pursuant to Contract No. W-31-109-ENG-38 between the United States Government and the University of Chicago and/or pursuant to DE-AC02-06CH11357 between the United States Government and UChicago Argonne, LLC representing Argonne National Laboratory.

TECHNICAL FIELD

The present disclosure relates generally to Janus membranes and methods for fabricating and using the same.

BACKGROUND

Membranes are utilized in a range of form factors, in broadly different environments, and for wide range of functions. Generally speaking, membranes are flat or at least have a thickness typically much less than its diameter or width. Thus, membranes are typically described by a first side and a second side and the bulk material between the two sides, optionally with a periphery defining the exposed edges between the first side and second side.

Within the general category of membranes are membranes having asymmetric properties, wherein one side of the membrane has differing properties from the other side. In particular, so-called "Janus" membranes are an emerging class of membrane materials engineered to have differing properties at their opposite surfaces. Such membranes have generated excitement for their potential to manipulate fluid transport properties in powerful new ways. Janus membranes can improve efficiency in conventional applications; they also exhibit entirely novel phenomena useful in unconventional applications. The presence of divergent surface properties have led to Janus membranes being utilized in a host of challenging applications, such as but not limited to battery separators, oil/water emulsification and deemulsification, fog harvesting, blood plasma separation, membrane distillation/nanofiltration, and fine bubble aeration.

While Janus membranes are generally recognized for their wide-spread utility, ongoing development in the methods of fabricating the membranes continues to expand the uses for the membranes. There are currently two main methods of creating Janus membranes: asymmetric fabrication and asymmetric decoration.

Asymmetric fabrication approaches involve directly constructing double layers in a stack. Examples include sequential electrospinning, spray-coating of polymers and nanoparticles, sequential filtration of functional nanomaterials, and casting solutions with surface-migrating additives.

Asymmetric decoration approaches, in contrast, rely on the physical/chemical modification of a single side of an extant porous structure. In one class of decoration approaches, a phase interface is introduced at one membrane face, and the decoration is limited to one side of that interface. The interface can be liquid-gas, such as in the deposition of mussel-inspired polydopamine to membrane surfaces floating in fluids. Alternatively, a solid-gas interface can be introduced in the form of a polymer, which physically blocks part of the membrane from modification and can then be removed by dissolution, etching, or peeling.

Diffusion-limited modifications are another class of asymmetric decoration approaches demonstrated in recent literature. For example, by controlling the time that cotton fabric was exposed to hydrophobic silane vapor, the extent of a hydrophobic modification could be controlled. Similarly, a gradient of hydroxyapatite crystallites were deposited onto polyvinylidene fluoride (PVDF) membranes by pre-wetting with one reactant and allowing the second to diffuse in from one side. Recently, oxygen plasma was used to hydrophilize an 18 nm depth of 8 nm diameter silica nanopores made hydrophobic by atomic layer deposition of a trimethyl-silane coating. Such diffusion-mechanism approaches can, in principle, enable processing to control the extent of the Janus modification layer.

The thickness of the Janus modification layer, or the through-membrane position of the property gradient, influences the performance of the material across applications and should ideally be controlled with precision. The ratio of the thickness of each layer, along with the sharpness of the property transition, will have profound effects on fluid transport through the membrane. However, precise control of the transition interface is challenging or impossible for most Janus decoration approaches. In practice, for example, it can be difficult to reproduce conditions that position the fluid-gas interface adjustably within the membrane. Deposited materials, such as nanoparticles or other functional materials, may inconsistently cover the interior pore structure of a membrane. When deposited by filtration or by sol-gel processes, nanomaterials can also constrict or even block the pores of the underlying membrane. Depending on the interactions (electrostatic, van der Waals) between the decorating material and membrane, along with the intended application of the material, shedding or delamination of the decoration may occur. Processes that could yield well-adhered decorations with tunable extent and coverage would represent a valuable addition to the field, enabling process optimization by control of the spatial extent of the Janus decoration.

Thus, there remains a need for a strategy to produce Janus membranes that yields well-adhered, controllable coatings decorated on one side of the membrane.

SUMMARY

Some embodiments described herein relate generally to a method of fabricating a Janus membrane. The method comprises positioning a membrane in a housing in an Atomic Layer Deposition (ALD) reactor, the membrane having a first side and a second side and comprising a material, the membrane positioned within the housing with the second side adjacent to and masked by a portion of the housing and the first side exposed to a reaction chamber of the ALD reactor. The method further comprises depositing an oxide coating on the first side of the membrane and within a network of pores within the membrane by atomic layer deposition. The ALD proceeds by the steps of exposing a first ALD precursor flux comprising a first ALD precursor at a first deposition temperature, a first vapor pressure, and for a first exposure time; absorbing the first ALD precursor to the first side of the membrane and within a portion of the network of pores; exposing a second ALD precursor flux comprising a second ALD precursor at a second deposition temperature, a first vapor pressure, and for a first exposure time; reacting the absorbed first ALD precursor with the second ALD precursor; and forming a coating on the first side and the portion of the network of pores. The flow of the first ALD precursor in the network of pores is governed by Knudsen diffusion.

Other embodiments relate to a method of fabricating a membrane comprising positioning a membrane lacking polar functional groups in a housing in an Atomic Layer deposition (ALD) reactor, the membrane having a first side and a second side and depositing an oxide on the first side of the membrane and within a network of pores within the membrane by atomic layer deposition. The ALD proceeds by the steps of performing a first set of cycles of exposing a first ALD precursor flux comprising a first ALD precursor at a first deposition temperature, a first vapor pressure, and for a first exposure time; absorbing the first ALD precursor to the first side of the membrane and within a portion of the network of pores; exposing a second ALD precursor flux comprising a second ALD precursor at a second deposition temperature, a first vapor pressure, and for a first exposure time; reacting the absorbed first ALD precursor with the second ALD precursor; and forming a plurality of oxide seeds on the first side and the portion of the network of pores.

Other embodiments relate to a Janus membrane. The Janus membrane comprises a membrane comprising a polymer and lacking polar functional groups, the membrane comprising a tortuous network of pores. A conformal coating of oxide is deposited on a first side of the membrane and extending a distance into the pores towards the second side. The conformal coating on the first side has a uniform thickness and the coating within the pores exhibits a thickness gradient.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

FIG. 1B is a top view, FIG. 1C is a perspective view, and FIG. 1D is a side view. Note, for ease of illustration pores are shown as simple through-pores, but the pores may be a tortuous network of pores.

FIG. 2B has a precursor exposure time of 0.015 seconds. FIG. 2C has a precursor exposure time of 0.06 seconds. FIG. 2D has a precursor exposure time of 0.15 seconds. Background shading is meant to guide the eye to the two different regimes through the thickness of the membranes, with a denser region near the exposed surface, and a rapid drop off in metal oxide growth further down.

FIG. 5A is a graphical representation of one embodiment of the aeration process. FIG. 5B illustrates a hydrophobic, untreated membrane, showing that air spreads as a film leading to large bubbles. FIG. 5C shows one embodiment of a Janus membrane having a superaerophobic surface, which minimizes the adhesion between the membrane surface and the bubble, leading to fine-bubble aeration.

FIG. 7A is schematic of the cross section of the physical housing of the membrane which isolates the front face for vapor diffusion. FIG. 7B is a cross-sectional SEM of the polypropylene reveals the tortuous porosity that leads to diffusion-controlled ALD, scale is 50 μm. FIG. 7C is an illustration of vapor diffusing through the pore volume from the front side. Nucleation occurs more quickly near the surface due to greater concentration of reactants closer to the front surface. After nucleation, growth proceeds to form a coating with decreasing coverage through the membrane.

FIGS. 11A-11D show Cross-sectional EDS spectra for 150, 200, 300, and 350 cycle samples at three vapor exposures demonstrating the migration of the transition feature to deeper within the membrane interior.

FIGS. 12A-B show the back face and the front face of a Janus membrane. The back face is hydrophobic, appears bare in SEM show in FIG. 12C (back face) and FIG. 12D (front face) scale is 5 mm and 400 nm, and FIGS. 12E-12F show virtually no EDS signal for oxygen or aluminum (FIG. 12E corresponding to back face, and FIG. 12F corresponding to front face). In contrast, water spreads on the hydrophilic front face, the membrane is covered with aluminum oxide in SEM, and shows substantial oxygen and aluminum in EDS.

FIGS. 13A and 13B show SEM micrographs of the pristine polypropylene membranes from the top surface and in cross-section, revealing the tortuous microporosity and high aspect ratio. Scale bars are 400 nm (FIG. 13A) and 50 microns (FIG. 13B), respectively. FIG. 13C shows SEM images of PP membranes after exposure to various ALD deposition conditions.

Figure 1A:
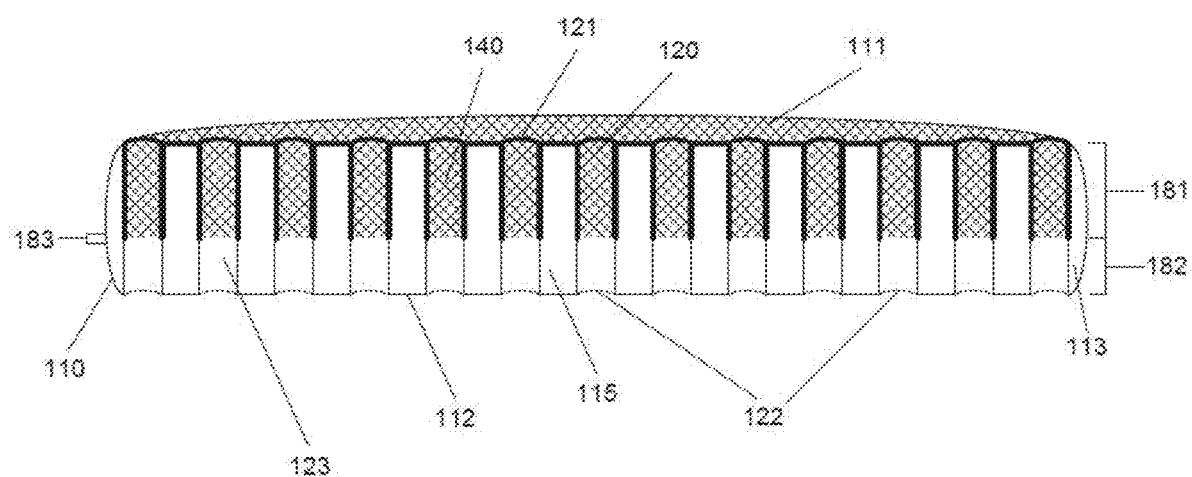
FIG. 1A is a cross-sectional schematic of a Janus membrane

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Described herein are Janus membranes and systems and methods relating to same. In on embodiment, atomic layer deposition ("ALD") is utilized to fabricate porous membranes consisting of a compositional gradient ranging from one side of a membrane to the opposite side of the membrane. For example, the membrane may have a gradient of exposed hydrophobic polypropylene to coated hydrophilic metal oxides. The depth of the coating into the membrane (into the pores) is observed to have a profound impact on surface wetting properties.

Atomic layer deposition (ALD) is a chemically diverse vapor-phase deposition technique with the capability to synthesize ultra-thin and pinhole-free films, for example oxide barriers, with well-defined surface chemical control and precise physical thickness. While ALD is essentially a chemical vapor deposition (CVD), it is unique in that it can allow very high control for deposition of extremely thin layers (e.g., less than 1 nm thick layers) on the substrate. One or more precursors, for example gaseous precursors are inserted sequentially into the ALD chamber. The precursors interact in the ALD chamber to layer-by-layer deposit a film, layer or otherwise coating (e.g., a metal oxide) on the substrate positioned in the ALD chamber over numerous insertion cycles. ALD enables layer-by-layer conformal growth. As described herein, the term "conformal" implies that the ALD deposited layer or coating conforms to the contours of structure on which it is deposited. In the case of a porous structure, the deposition occurs on the exposed surface, including within the pores. While the coating within the pores will not typically be uniform thickness (with decreasing thickness progressing into the pore, the exterior surface of the side exposed to ALD will, typically, exhibit a uniform thickness as is normally observed in ALD.

In such a conformal regime, ALD allows for membranes to be functionalized with metal oxides without substantially changing the pore geometry. Oxides grown on porous materials simply constrict the pore size and introduce a roughness associated with the particular metal oxide. Though ALD is commonly considered a surface-saturating conformal coating technique, even in porous materials, diffusion-limited behavior has been observed in high-aspect-ratio nanoporous systems.

One embodiment relates to a diffusion-controlled ALD approach to impart a hydrophilic/superaerophobic layer, for example, but not limited to $Al_2O_3$, onto hydrophobic membranes, such as but not limited to polypropylene. Thus, the unexposed (to ALD) portions of the membrane are hydrophobic while the ALD coated portions are hydrophilic. The extent of ALD precursor infiltration into the pores of the membrane, and therefore the position of the hydrophilic-hydrophobic interface within the membrane, are tuned using the exposure dose and partial pressure of ALD reactants, the purge time of the vapors, and the number of reaction cycles.

With reference to FIG. 1A, one embodiment of a Janus membrane is shown. The Janus membrane 100 comprises a membrane 110. The membrane will have a property that contrasts with a corresponding property of the coating, for example surface charge, hydrophobic/philic, oleophobic/philic, solvophobic/philic, and other surface chemistry aspects such as affinity for binding a species or catalytic activity. The membrane may be hydrophobic. The membrane may comprise material selected from a membranes that are generally unreactive to the selected first ALD precursor and may also be unreactive with the second ALD precursor. Membrane materials that are generally considered unreactive to ALD precursors include polymers lacking in polar functional groups, which groups would normally associate with ALD precursors. In one embodiment, the membrane comprises a polymer lacking polar functional groups (for example, carbonyls, amines, etc.) and the first ALD precursor is an organometallic precursor reactive with a polar functional group. For example, the membrane may comprise a polymer, such as polypropylene. In one embodiment, the membrane has a circular shape and a diameter of diameter, typically sized for use in a typical commercial ALD reactor. As shown in FIG. 1A, the membrane has a top surface or first side 111, a bottom surface or second side 112 and a periphery surface 113. The volume of the membrane therein is referred to as the membrane bulk 115. It should be appreciated that the membrane, and the resultant Janus membrane 100, are illustrated as having a circular shape, i.e. a thin three-dimensional disk. However, other shapes maybe utilized as understood in the art for membranes generally, for example spiral-wound or hollow-fiber membranes.

The membrane 110 includes a plurality of pores 120. The pores 120 extend from the first side 111 to the second side 112 with each pore having a top opening 121 and a bottom opening 122 and with a sidewall 123 extending through the membrane bulk 115. In one embodiment, the pores form a tortuous network of pores. That is, the pores will provide a continuous path that fluid (or vapor) can follow from the top surface out the bottom surface The combined membrane thickness, pore size, and tortuosity are such that the system is governed by Knudsen diffusion and not viscous flow. Thus, the pores have dimensions such that Knudsen diffusion will occur, that is the mean free path of the precursors will be comparable to or larger than the diameter of the pores.

Based on traditional ALD chemistry, one would not expect the described coating to grow on the described polymer membranes given the absence of reactive groups. However, as illustrated in FIG. 1A, the coating 140 is present on one side of the membrane 110 and extends into the pores 120. The nucleation of the coating on unreactive polymers such as polypropylene has been explained as relying on the residence of adsorbed but unreacted first precursor, such as TMA, in the near sub-surface of the material, which does not escape during the purge step. It is believed that the purge step will accomplish a complete purge, even of the adsorbed precursor, if the purge is sufficiently long, something that was generally desired in the prior art. However, when the purge is sufficiently short then adsorbed precursor will remain for exposure to the second precursor. This growth path leads to discrete nucleation islands of the coating. After nucleation, more typical layer-by-layer growth can proceed. With increased cycles, these clusters coalesce into a continuous conformal coating. ALD has been demonstrated on polypropylene films and fibers in the context of this proposed mechanism.

ALD has been used to coat polymeric membranes with thin conformal inorganic metal oxides in an effort to improve their performance. Wang et al. used ALD to completely coat polypropylene with conformal $Al_2O_3$ and $TiO_2$ to produce hydrophilic membranes with high flux. Rather than rely on physically trapped residual inorganic precursors, in these studies, reactive surface sites were introduced to the polymer via oxidative damage by submerging in nitric acid or exposing to oxygen plasm. Oxygen plasma has been shown by x-ray photoelectron spectroscopy (XPS) to incorporate oxygen-containing functional groups along polypropylene's hydrocarbon backbone. These pretreatments alter the membrane to create reactive sites (for the ALD precursor) and increase the nucleation rate of the deposition by allowing TMA to chemically react and form initial conformal layers on the polymer surface.

Figure 8:
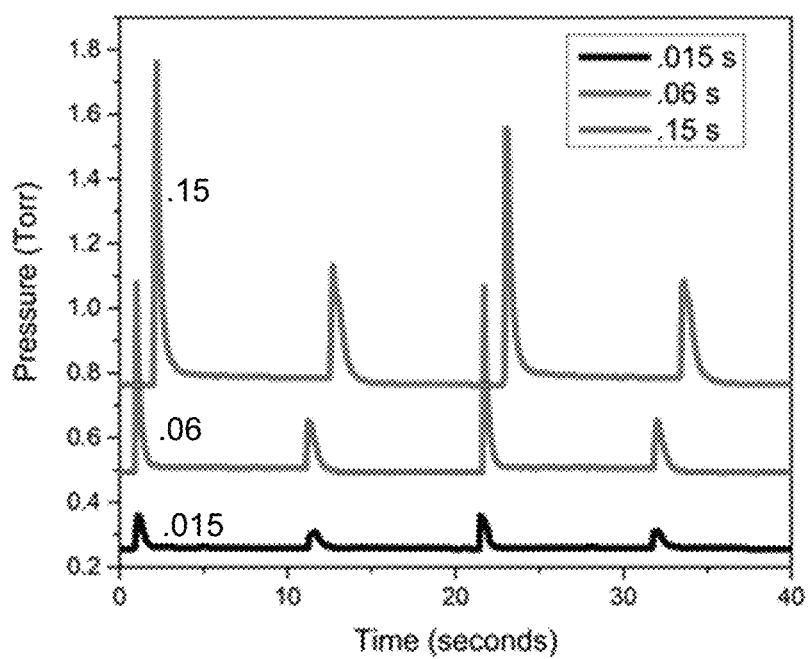
FIG. 8 is a graph showing pressure transients of two TMA|purge|water ALD cycles at three different pressures. Data was offset vertically for clarity.
Figure 9A:
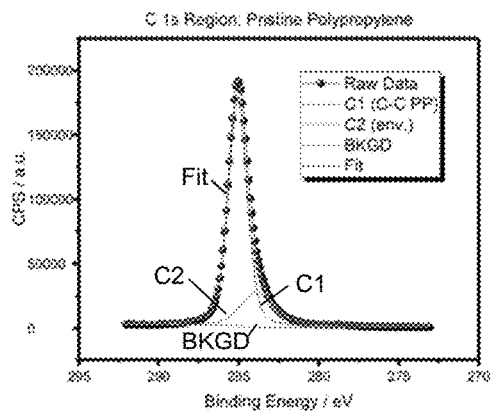
FIGS. 9A-9D show XPS data of the pristine polypropylene before and after an Ar surface cleaning.
Figure 9B:
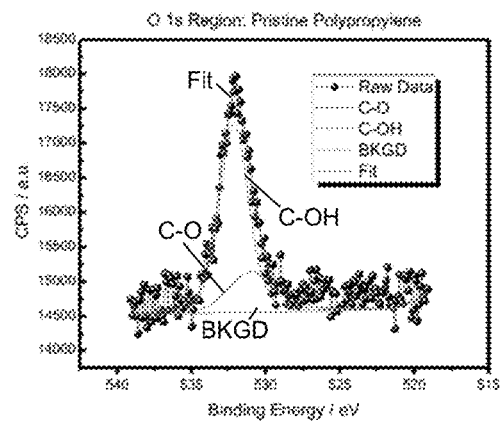
Figure 9C:
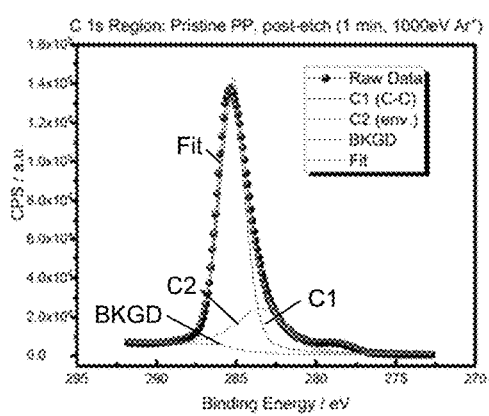
Figure 9D:
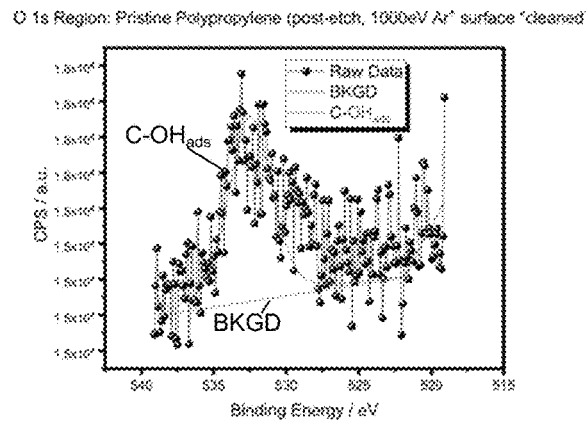
Figure 10:
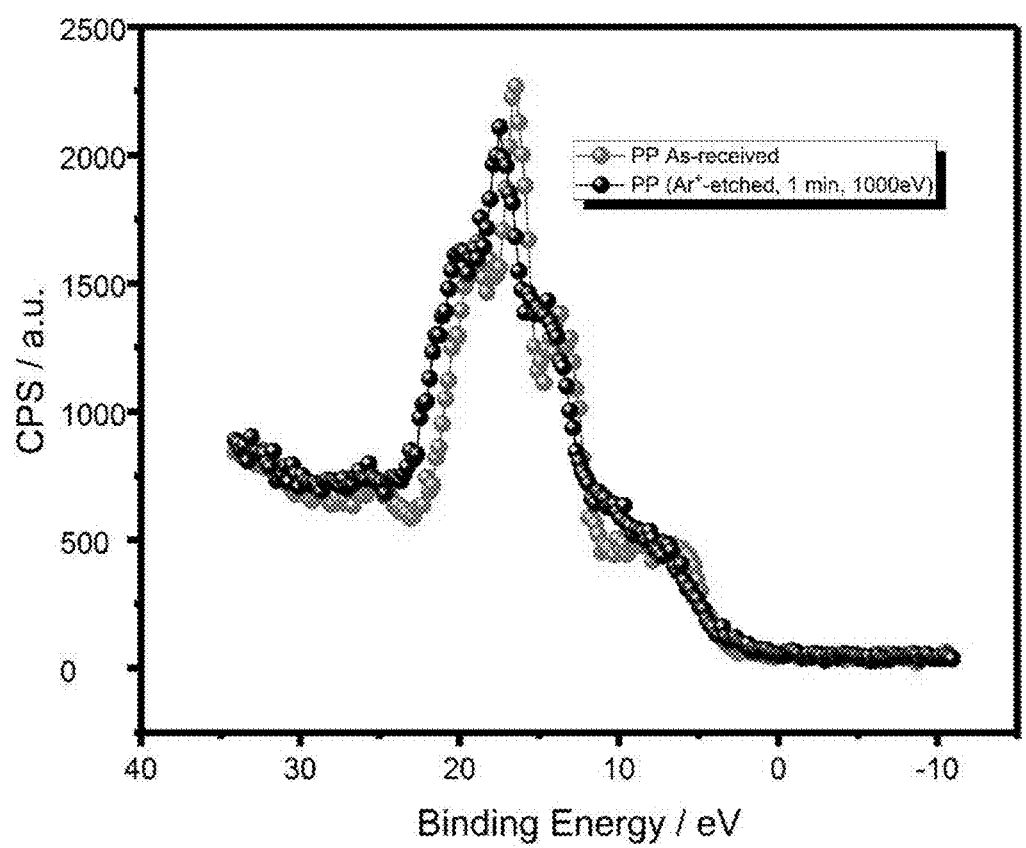
FIG. 10 shows a graph of 0.5-1 eV shift after etching (1 min, $Ar^+$ 1000 eV) corresponds roughly to the removal of ~½ of the $OH_{ads}$ groups.

Complete coverage of microporous polypropylene was a design goal in that previous work; here, we have utilized diffusion-limited transport of precursors through high-aspect-ratio and relatively unreactive (and unmodified) polypropylene to enable an inhomogeneous coating through the membrane's thickness in order to impart Janus-like behavior. FIG. 8 shows ultrahigh-resolution XPS measurements on the as-received pristine polypropylene membranes, which reveal a total oxygen content of 1.10 at. %. After a one-minute 1 KeV $Ar^+$ exposure, the oxygen content is reduced to 0.46 at. %. This reduction in oxygen signal shows that some of the initial oxygen signal is due to adsorbed water; the remainder suggests some minor C—O content throughout the polymer, presumably the result of impurities or defects in the polymer chains. These sparse moieties present sites by which TMA could potentially directly associate with the polymer to form a covalent linkage, in addition to any non-reacted physisorbed TMA that leads to scattered and slow nucleation.

Further the conformal coating 120 is not uniformly thick throughout. In order to understand why the processes used in this study does not produce a uniform conformal coating through the entire membrane thickness, one must examine the length scales and morphology of the system. The high aspect ratio, small pore size, and high tortuosity of the polypropylene membranes lead to this asymmetric deposition, with a high density of $Al_2O_3$ at the exposed surface that decreases through the thickness of the membrane. The mean free path of the ALD reactant vapors is described by Equation 1:

$$\tau = \frac{kT}{\sqrt{2}\,\pi P d_m^2} \quad (1)$$

In this expression, P is the precursor partial pressure and $d_m$ is the kinetic diameter of the gas molecule. Under typical ALD conditions the mean free path is generally on the micron scale. For example, the value of TMA at 1 Torr and 450 K is 40 μm.[29] The polypropylene membranes used in these studies have an average pore size of 200 nm, a thickness of ~160 μm, and a highly tortuous networked pore structure. Ignoring the tortuosity of the porous pathways, the aspect ratio (L/d) of the membrane is ~800. Since the mean free path far exceeds the average membrane pore diameter (l/d ~$10^3$), the transport of these precursors is described by molecular or Knudsen diffusion. In Knudsen diffusion, the vapor molecules scatter against the pore walls with far greater frequency than with other vapor molecules. FIG. 7C shows a schematic of how $Al_2O_3$ nucleates and grows to yield a Janus structure.

Thus, the Janus membranes described herein include a coating of material deposited by ALD where traditional chemistry would not expect deposition to occur. However, as illustrated in FIG. 1A, the Janus membrane 100 includes a conformal coating 140 on one of the sides of the membrane 110. The coating may comprise metal oxides such as $Al_yO_x$, ZnOx, SnOx, HfOx, TiO2, ZrOx. For ease of reference, it shall be referred to as a coating 140 on the first side 111 but should be understood as being able to be coated on the first side 111 or second side 112 unless otherwise specified. These may be viewed as top and bottom sides as illustrated. The coating 140 extends into at least some of the plurality of pores 120. It is believed that the coating is independent of proximity (with reason as one of skill would understand). Further, it is also believed that pore location does not matter in that depth into the plurality of pores should be equal at any point on the membrane subject to minor variations due to the tortuous nature of the pores. In one embodiment, the coating 140 extends a penetration distance $D_p$. The penetration distance within plurality of pores may be, on average, 5 to 50 microns. The resultant Janus membrane includes a modified portion 181 (such as a hydrophilic portion), a unmodified portion 182 (such as a hydrophobic portion) and an interface 183 there between (such as a hydrophilic/hydrophobic interface).

Figure 1B:
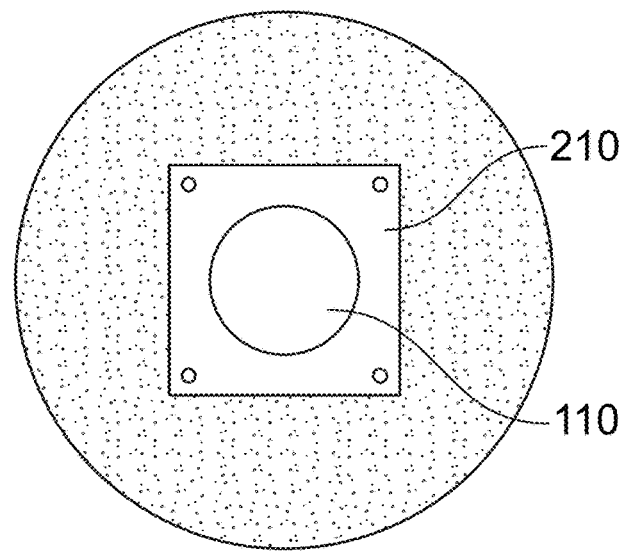
FIGS. 1B-D illustrate a schematic of one embodiment for the masking mount used for selective ALD deposition for Janus membrane fabrication.

In certain embodiments, a system for and method of fabricating the Janus membranes is provided. The membrane 110 is secured in a housing 210. The housing 210 may be, for example, aluminum or another (to the ALD precursors and environment) metal. The housing 210 may be engaged with a portion of the ALD reactor 201 The housing 210 maybe inert to the ALD reactions. The housing may include, as shown in FIG. 1B, a masking plate 215 and a fixture 216. The masking plate 215 and fixture 216 may both be plates, with the fixture 216 having an opening to allow exposure of the first side to the ALD precursor. In one embodiment, the fixture 216 and masking plate 215 are sealably secured together to prevent ALD precursors from infiltrating between them and exposing the bottom side 112 of the membrane 110. The masking plate 215 is disposed against the membrane and masks one side of the membrane, i.e. the unexposed side that remains uncoated post-ALD. The fixture 216 engages with the masking plate 215 to secure the membrane against the masking plate 215. The membrane 110 fits within the housing 210 to limit exposure of the reactant vapors to one face of the membrane 110 (i.e., the modified surface). In the illustrated embodiment, the housing 210 consists of a bottom aluminum plates 215 and a top aluminum plate 216 best seen in FIG. 1D. The top aluminum plate 216 has an opening 217 to accommodate deposition on the membrane disposed in the housing 210. In one embodiment, the housing 210 may also extend about a portion of the first side 111 of the membrane to retain the membrane 110. As a result, that portion may remain uncoated. The housing 210 may be positioned on a portion 202 of the ALD reactor and exposed to an inlet 203 or source for the ALD gases and an exhaust 204 to vent the ALD gases.

In one embodiment, a method of creating the Janus membrane, such as one shown in FIG. 1A, includes ALD deposition of the coating 120 on the membrane 110. The membrane 110 is positioned in an ALD reactor. The ALD reactor device includes a closed reaction chamber with the membrane 110 positioned therein and with the first side 111 exposed and the second side 112 blocked by the housing 210. An initial purging may be utilized to drive off any absorbed materials on the membrane, such as adsorbed water, for example 30 minutes of purge with the inert gas used for the ALD purge step(s), such as nitrogen at 100 sccm. A first ALD precursor is introduced for a first period of time as a first ALD precursor flux. The first ALD precursor adsorbs to the membrane 100. Specifically, the first ALD precursor diffuses through the reaction chamber and interacts with the first surface 111 of the membrane 110. The first ALD precursor also diffuses into the plurality of pores 120. The first ALD precursor forms a first half-step structure adsorbed to the membrane. A plurality of such half-step structure are adsorbed where the first ALD precursor was exposed to the membrane. Optionally a first inert gas is used to purge the first ALD precursor. The second ALD precursor is introduced for a second period of time as a second ALD precursor flux. The second ALD precursor reacts with the first half-step structure to form the coating. Optionally a second inert gas is used to purge the second ALD precursor.

The distance that the first ALD precursor and the second ALD precursor diffuse into the pores may be controlled by one or more parameters such as precursor vapor pressure, precursor exposure time, and temperature. In one embodiment, the vapor pressure and exposure time are utilized to control the diffusion distance, hence the depth of the coating in the pores, due to temperatures impact on additional aspects of the ALD process or the membrane itself. In one embodiment, the temperature for the ALD process is between 60° C. and 110° C. and the pressure is up to 1 Torr.

One parameter that can be used to control depth of diffusion is the length of precursor exposure. This is the length of time over which the dosing valve of the ALD reactor is opened and the precursor gas is exposed. This determines how much of the gas enters the reaction chamber. This also controls the peak pressure of the gas in the chamber in the space directly above the exposed membrane, which governs the boundary conditions of the diffusion behavior. The longer the pulse, the higher the pressure, and the more vapor can diffuse in, which leads to a deeper extent of coverage. Thus, one of skill in the art can determine the total exposure of precursor necessary to achieve a desired penetration into the pores (depth into the pores).

Similarly, the pressure of the gas provided to the reaction chamber can also be controlled, with higher pressure resulting in more diffusion into the pores. In one embodiment, the pressure of the first ALD precursor exposure is up to 1 Torr and the pressure of the second ALD precursor is up to 1 Torr.

Another parameter that can control diffusion into the pores is this the length of time between pulses, which may include a purge step. This controls how much of the precursor that diffuses into the exposed membrane can subsequently leave and be evacuated from the chamber. The longer the purge, the less coating will form as more of the precursor will have been evacuated rather than remaining absorbed (first ALD precursor) or reacting with the first ALD precursor (for the second ALD precursor). It is believed, see, e.g. the contact angle vs purge time data in FIG. 3E, that there is less coating growth with larger purge times, but that depth of deposition of coating into the pores is not changed substantially. In one embodiment, the length of the first purge step is 10 to 60 seconds at a pressure of up to 1 Torr. In one embodiment, the length of the second purge step is 10 to 60 seconds at a pressure of up to 1 Torr Further, the number of cycles of ALD may be controlled. The number of cycles determines how dense the oxide along the diffusion gradient forms. Each subsequent cycle grows the seeds more and/or deposited further coating on the underlying coating material to provide a thicker coating. This, in turn, controls the wetting properties and also the slope of the coating gradient. In one embodiment, the number of ALD cycles is in the range of 100 to 300 cycles, preferably at least 150 cycles.

Temperature of the ALD reactor may also be controlled to alter the coating deposition. Higher temperatures would give a greater depth of coverage, however, higher temperatures may also negatively impact the membrane material itself or result in further undesirable ALD reactions. In one embodiment, the temperature of the ALD reactor is between 60° C. and 110° C.

In one embodiment, the method of fabricating the Janus membrane includes a mechanism by which after relatively slow nucleation of alumina islands over the first 150-250 cycles, growth proceeds rapidly on already deposited $Al_2O_3$ leading to a rapid onset of hydrophilicity. In such embodiments, the first ALD precursor either adsorbs to the membrane or, as can be appreciated increasingly so for later cycles of ALD, binds with already formed alumina on the surface of the membrane. In this manner, the first cycle of ALD forms seeds or islands of alumina on the membrane. It is believed that the resultant alumina is covalently bonded to the membrane. Additional cycles form additional islands or grow existing islands. A sufficient number of ALD cycles can be performed to form the coating. In one embodiment such as using a polypropylene membrane with a metal oxide coating, such as alumina, greater than 150 cycles are utilized. Additional cycles can provide the membrane with a coating that is overall more hydrophilic such that a water droplet is able to more be quickly imbibed, for example a coating of at least 325 cycles, 350 cycles, or 400 cycles. One of skill in the art will appreciate an upper bound on the number of cycles to be imparted by practical effects of a coating on a membrane and desire to maintain a certain form factor for the membrane.

For certain embodiments, such as those with a coating of $Al_2O_3$, the method of fabrication may involve spatial control of surface hydroxyl groups laterally across a substrate's surface to serve as a platform for further functionalization.

EXAMPLES

In one embodiment, the coating comprises $Al_2O_3$. The membrane is a ~47 mm diameter polypropylene membrane with a thickness of ~160 μm and having a pore size of ~200 nm. The ALD coating is applied by alternating pulses of trimethyl aluminum and water vapor lead to the growth of covalently bonded $Al_2O_3$ conforming to the membrane pore surfaces. The resultant coating coverage decreases through the depth of the membrane due to physical manipulation of the vapors' access. The polypropylene's small pore size (200 nm) and high tortuosity leads to diffusion-limited growth, where the extent of oxide penetration can be tuned using processing parameters. For a given exposure dose and purge time, increasing the number of cycles decreases the water contact angle from hydrophobic to hydrophilic, until a threshold at which the droplet is completely imbibed by the membrane.

To demonstrate the utility of these Janus membranes, a hydrophilic/superaerophobic Janus surface treatment is shown to greatly reduce the size of air bubbles generated through the membrane, enabling faster mixing. This technique represents the first application of vapor-deposited covalently bonded metal oxides to form Janus membranes. Further opportunities are afforded by the ability to spatially, such as laterally, pattern this interfacial functionalization.

The Janus modification process is examined via scanning electron microscopy of the top surface, along with cross-sectional elemental mapping by energy dispersive spectroscopy (EDS). The depth to which dyed water is drawn into the hydrophilized membrane face by capillary rise is shown to depend on the vapor exposure dose, illustrating control of the hydrophilic/hydrophobic interface property. This diffusion-limited ALD approach to Janus membrane decoration brings together the desirable properties of conformal metal oxide coatings and controllable processing kinetics of a vapor-phase reaction. The wetting properties of the Janus membranes are investigated using sessile drop contact angle tests and reveal a progression from hydrophobicity to a decrease in contact angle, followed by the onset of complete wetting and drop imbibition. Captive bubble contact angle measurements demonstrate an analogous transition from aerophilicity to superaerophobicity. Further, experiments demonstrate the utility of this hydrophilic-hydrophobic Janus membrane in dramatically reducing bubble size in an aeration process relative to pristine polypropylene membranes, which can improve gas delivery in a number of industrial applications.

As described further below, embodiments of the Janus membrane provide a new asymmetric decoration technique based on atomic layer deposition in which a hydrophilic $Al_2O_3$ wetting skin layer is grown on hydrophobic microporous polypropylene to form a Janus membrane. ALD processing parameters have been shown to precisely control the density and depth of coverage of the covalent and conformal $Al_2O_3$ functionalization. This depth-controlled modification, is a result of the Knudsen diffusion-limited transport of ALD reactant vapors through the tortuous pore pathways of the membrane. Using precise control of vapor exposure dose, vapor purge time, and total number of reaction cycles, contact angle measurements demonstrated an onset of wetting and hydrophilicity of the exposed surface across a range of conditions.

In some experiments described below, the housing prevented the alternating pulses of TMA and water from contacting the back face resulting in no loss of its native hydrophobicity during processing. The housing also enables sharp lateral hydrophilic/hydrophobic interfaces along a single membrane face. The figures illustrate cross-sectional EDS mapping to show that the extent of the $Al_2O_3$ pushes deeper into the membrane with increasing vapor pressures.

To show the utility of this asymmetric ALD technique in controlling the interfacial properties of microporous membranes, we demonstrate these Janus membranes can dramatically reduce the size of pressurized air bubbles released into a column of water in an aeration experiment. Thus, this ALD approach offers the ability to make a controlled hydrophilic/hydrophobic interface within microporous membrane materials. The convenient surface-terminated hydroxyl groups that make $Al_2O_3$ hydrophilic/superaerophobic also present a convenient linkage site for macromolecular grafting or subsequent ALD with other functional oxides. In future work, diffusion-limited ALD will facilitate both in-plane and depth control of porous materials functionalization across many applications.

Janus Membrane Fabrication

Polypropylene membranes were purchased from Sterlitech Corporation. The purchased membranes were 47 millimeter in diameter and rated as having a 200 nanometer pore size and an approximate thickness of ~160 microns. These were stored in a vacuum desiccator to limit adsorbed water. The Janus modification to these membranes was conducted in an Ultratech Savannah Atomic Layer Deposition Chamber. All ALD treatments were conducted at 80° C.

Figure 1C:
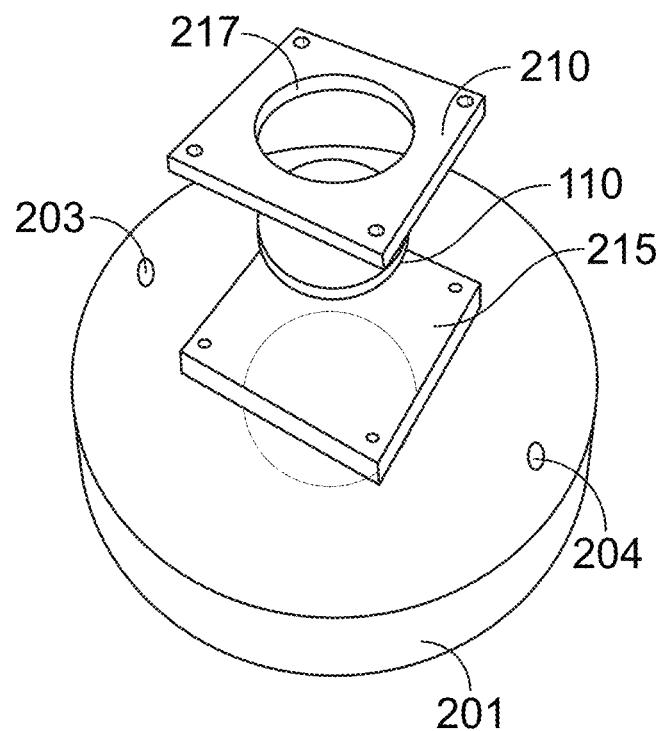
Figure 1D:
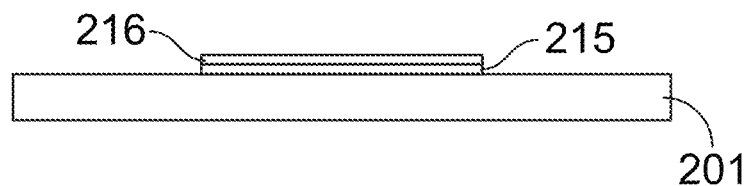

The $Al_2O_3$ coated Janus membrane was fabricated using a housing 210 to hold the membrane as illustrated in FIGS. 1B-1D. The polypropylene membrane 120 was secured in an aluminum housing to limit exposure of the reactant vapors to one face of the membrane (modified surface). This housing 210 consists of two aluminum plates as shown in FIG. 1D. The membrane was placed between the two plates 221, 222, with the top plate 221 having an opening 225 exposing one side of the membrane, which will become the modified surface. The plates 221, 222 are secured together. For the descried experiments, the polypropylene membranes (purchased from Sterlitech Corporation) are ~160 µm-thick discs 47 mm in diameter characterized as having an average pore size of 200 nm based on their separation performance. The SEM micrograph in FIG. 13A of the membrane cross-section reveals a highly polydisperse networked and tortuous pore path morphology.

The ALD tool is operated in flow mode where a single cycle is composed of a TMA pulse, a purge time where the vapor is exhausted, a water pulse, and a second purge. In flow mode, the ALD reactor chamber is exposed to a vacuum that serves as a drain as opposed to "exposure" mode for a reactor wherein there is no drain during exposure of a precursor and the pressure is allowed to dwell on the substrate. In all cases, the ALD system was held at 80° C., and the membrane system was held at vacuum under 100 sccm of nitrogen flow for 30 minutes prior to coating to drive off adsorbed water. The nitrogen flow is then set to a continuous 20 sccm (0.25 Torr) for the duration of the deposition process as a carrier gas. Janus membranes were fabricated at 0.015, 0.06, and 0.15 second exposures with varying purge time and number of cycles. These pulse durations result in a TMA dose (first ALD precursor) with an average peak partial pressure of 0.1 Torr, 0.45 Torr, and 0.7 Torr, respectively. The chamber is then then purged for ten seconds to remove excess TMA and product gases via the carrier gas flow. The water shutter is then opened to provide water (second ALD precursor) for the same length of time as TMA, with corresponding pressures of 0.05 Torr, 0.15 Torr, and 0.35 Torr (FIG. 8). The chamber is then purged again for ten seconds to complete one ALD cycle.

Based on traditional ALD chemistry, one would not expect alumina to grow on a purely hydrocarbon polymer given the absence of reactive groups. The nucleation of alumina on unreactive polymers such as polypropylene has been explained resulting from physisorbed TMA in the near sub-surface of the material, which does not escape during the purge step and consequently reacts with $H_2O$ during the subsequent $H_2O$ exposure. Given a sufficiently low coverage of physisorbed TMA, this mechanism leads to the formation of discrete alumina islands. With increasing ALD cycles, these islands can grow in three dimensions and eventually merge to form a continuous film. ALD has been demonstrated on polypropylene films and fibers in the context of this proposed mechanism Experimental Parameters Contact Angle Measurements Contact angle measurements were performed on a Dataphysics™ OCA 25 Contact Angle Measurement system. Distilled water was used as the drop fluid and a 1.0 microliter drop size was used in all experiments. Contact angle images were processed and analyzed using dataphysics SCA20 software module. Contact angle was measured from the first stable frame with a stationary contact line as drops spread and were partially imbibed. Captive bubble measurements were conducted in a glass cuvette filled with distilled water using a J-shaped needle to deliver air.

Scanning Electron Microscopy

The surfaces of the Janus membranes were imaged using a Carl Zeiss Merlin field-emission scanning electronic microscopy with an acceleration voltage of 1 keV and a typical working distance of 2 mm. Samples were affixed to stubs using copper tape and sputter-coated with 6 nm of carbon to mitigate charging.

Energy Dispersive Spectroscopy

Samples were prepared in cross-section by submersion into liquid nitrogen for one minute and then cracking along a notch prepared by a razor blade. The cleaved edge of the broken membrane was adhered to the vertical edge of a SEM sample stub using copper tape such that the Janus-modified side faced away from the sample stub. The membrane's broken edge was aligned to be flush with the lip of the stub wall. The sample was coated with 12 nanometers of carbon to mitigate charging. EDS measurements were conducted on a TESCAN LYRA3 field emission scanning electron microscope with an accelerating voltage of 10 keV and a working distance of 9 mm. EDS map spectra were collected using two Oxford Instruments X-Max$^N$ detectors and analyzed using the AZtec software package. Mapping scans were taken at an image magnification of 1000× and at a 512 pixel resolution. The energy range and channel number were set to auto, a process time of 4 and a pixel dwell of 50 microseconds were used.

X-Ray Photoelectron Spectroscopy

XPS measurements with $Ar^+$-sputter depth profiling experiments were carried out on a Thermo Scientific™ K-Alpha+™ spectrometer using a micro-focused monochromatic AlKα (1487 eV) X-ray source with a spot size of 400 μm and 100 μm for the surface and depth profiling analyses respectively. Samples were mounted on the instrument's standard stage and affixed to copper tape to help dissipate charging from the insulating (polymeric) samples. Additionally, a dual-beam electron flood gun (ultra-low energy co-axial electron and $Ar^+$ ion beam) was used for charge compensation during all surface analysis. The instrument uses a 128-channel 180° double-focusing analyzer and energy ranges of 0 to 1350 eV were swept for low-resolution surveys. High-resolution regions of interest (O1s, Al2p, C1s) were windowed off at the relevant binding energy range for the acquisitions. Mounted samples were evacuated on the sample stage mount in an isolated load-lock chamber until a base pressure of $3\times10^{-7}$ Torr or lower was achieved and were then transferred via a pneumatic transfer manipulator arm to the analysis chamber. Operational pressures in the analysis chamber prior to analysis were typically 1 to $4\times10^{-9}$ Torr and 2 to $4\times10^{-7}$ Torr with the e-flood gun on during surface analysis. Auto-firing TSP filaments and e-flood gun filaments were degassed prior to analysis. Processing of the spectra was performed in Thermo Avantage (v. 5.977, Build 06436) post-processing software and, if necessary, charge-correction of each spectrum was applied by referencing to the adventitious C 1s peak arising at 284.8 eV. Peak deconvolution of the high-resolution spectra (C1s, O1s, Al 2p) was performed using the Powell fitting algorithm with mixed Gaussian-Lorentzian (~30% L/G) line shapes and a Shirley/Smart background.

Aeration Apparatus

Aeration was conducted using a custom-designed apparatus constructed from a stainless steel body and an acrylic top-plate and tube. Screws provide tension to seal the membrane between the acrylic and a Viton o-ring to deliver compressed air through the membrane porosity into a 25 mL water column.

Analysis of Janus Fabrication

To demonstrate the Janus character of membranes treated with diffusion-controlled ALD process, drops of water were placed onto both surfaces of a membrane prepared with 350 cycles of alumna ALD at 0.015 seconds vapor exposure and ten second purge. FIGS. 12A-12B show the hydrophobic character of the unmodified second side (bottom in FIG. 12A) of the membrane in contrast with the modified hydrophilic first side (top in FIG. 12B). SEM images of the two sides (faces) reveal that the modified side (FIG. 12D) is conformaly coated with a granular deposit of $Al_2O_3$, whereas the unmodified face (FIG. 12C) has no discernable oxide, i.e. is smooth and featureless. Lastly, elemental analysis by energy dispersive spectroscopy (EDS) reveals strong aluminum and oxygen peaks on the front surface. The back face of the membrane shows virtually no signal for either aluminum or oxygen, confirming the asymmetric nature of the functionalization.

The influence on precursor exposure and cycle number on the resulting $Al_2O_3$ coating was examined. FIG. 13C shows top-down SEM micrographs of the $Al_2O_3$-modified Janus surfaces prepared at various precursor exposures and number of cycles. After 150 cycles, sparse spherical clusters of $Al_2O_3$ are observed. These clusters appear as white dots on the smooth polypropylene membrane surface which has a dark contrast in the SEM images. With increasing reactant exposures, these nuclei grow larger and much more closely spaced. By 200 cycles, the 0.06 second exposure sample is covered with discrete nuclei, whereas the 0.15 second samples has formed a nearly continuous coating. By 300 cycles, ALD $Al_2O_3$ films appear continuous across exposure times. The thickness of the ALD $Al_2O_3$ appears to increase with increasing precursor exposure, as evidenced by the polymer ligaments growing in thickness. This behavior results from faster nucleation using larger precursor exposures.

Modeling of diffusion and self-limited reactions in nanoporous substrates has shown that the coverage and transport are strongly influenced by a, a dimensionless parameter representing the ratio of reaction rate to diffusion rate inside the nanopores. In cases where the ALD precursors are supplied from one side of a porous substrate, and the exposures are insufficient to coat all of the available sites, then values of $\alpha > \sim 100$ yield stepped coverage profiles where the outer regions become saturated and the inner regions remain bare. In contrast, $\alpha<\sim10$ produces uniform, low coverage throughout the pores. Under the assumptions of Knudsen diffusion and circular pores, $\alpha=3/2(AR)^2\beta_0$ where AR is the aspect ratio (pore length/pore diameter) and $\beta_0$ is the initial sticking coefficient. For a given geometry, the value of $\alpha$, and hence the shape of the coverage profile, can vary depending on the reactive sticking coefficient: a high reaction probability can yield a stepped profile whereas a low reaction probability causes uniform, or gradually sloping low coverage, in otherwise identical porous networks.

Figure 2A:
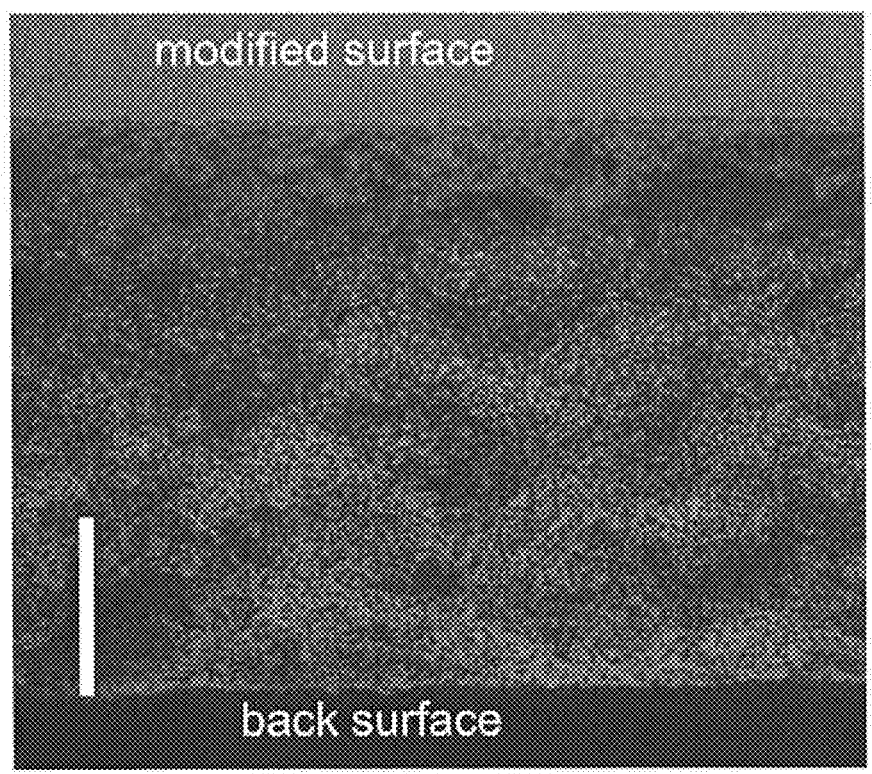
FIG. 2A is a cross-sectional SEM image of one embodiment of a Janus-modified PP membrane with overlaid EDS map showing the distribution of aluminum within the membrane. A gradient is apparent.
Figure 2B:
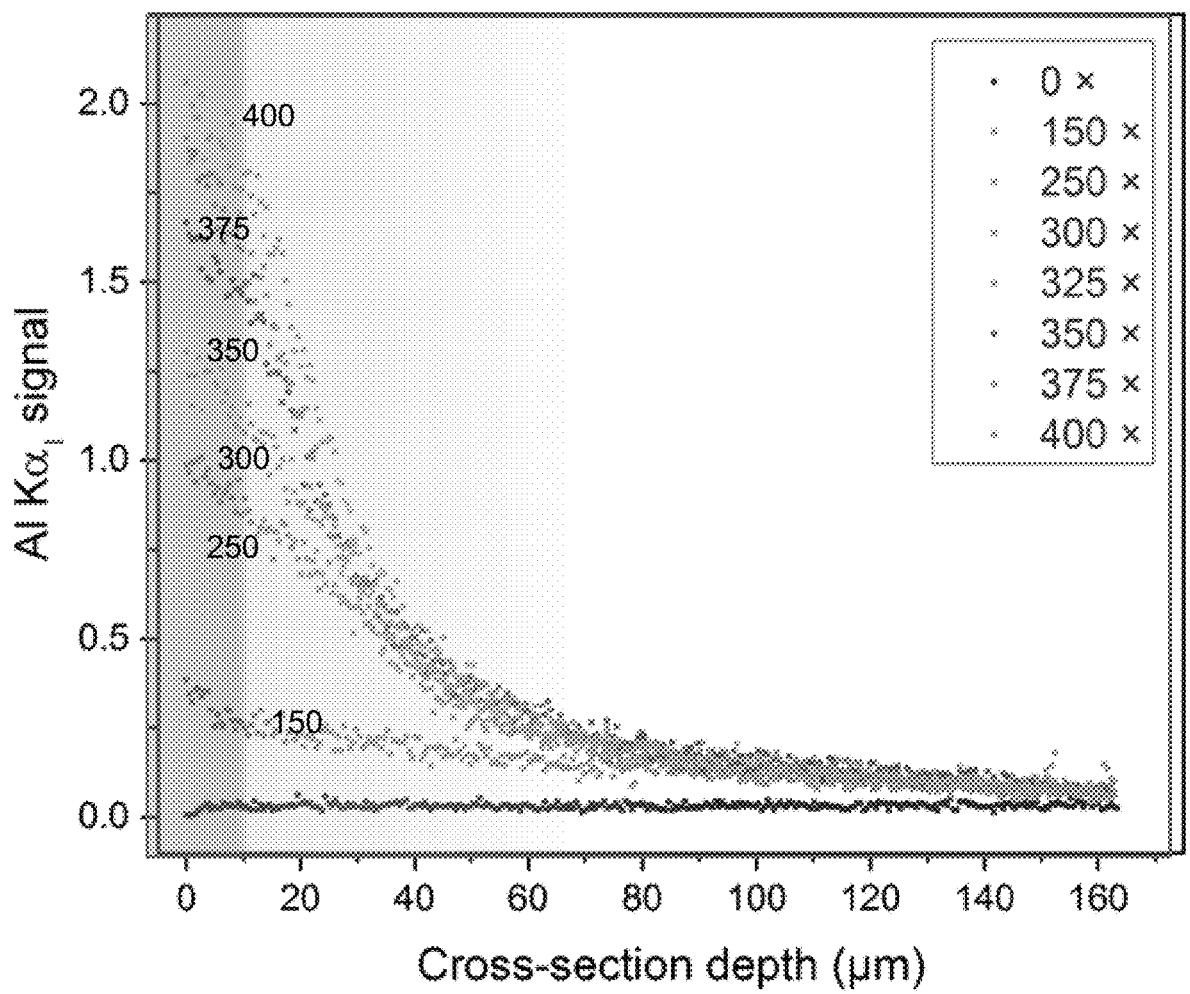
FIGS. 2B-2D show cross-sectional EDS measurements (averaged along the plane of the membrane) visualizing alumina distribution as a function of the number of ALD cycles under different precursor exposure times per cycle.
Figure 2C:
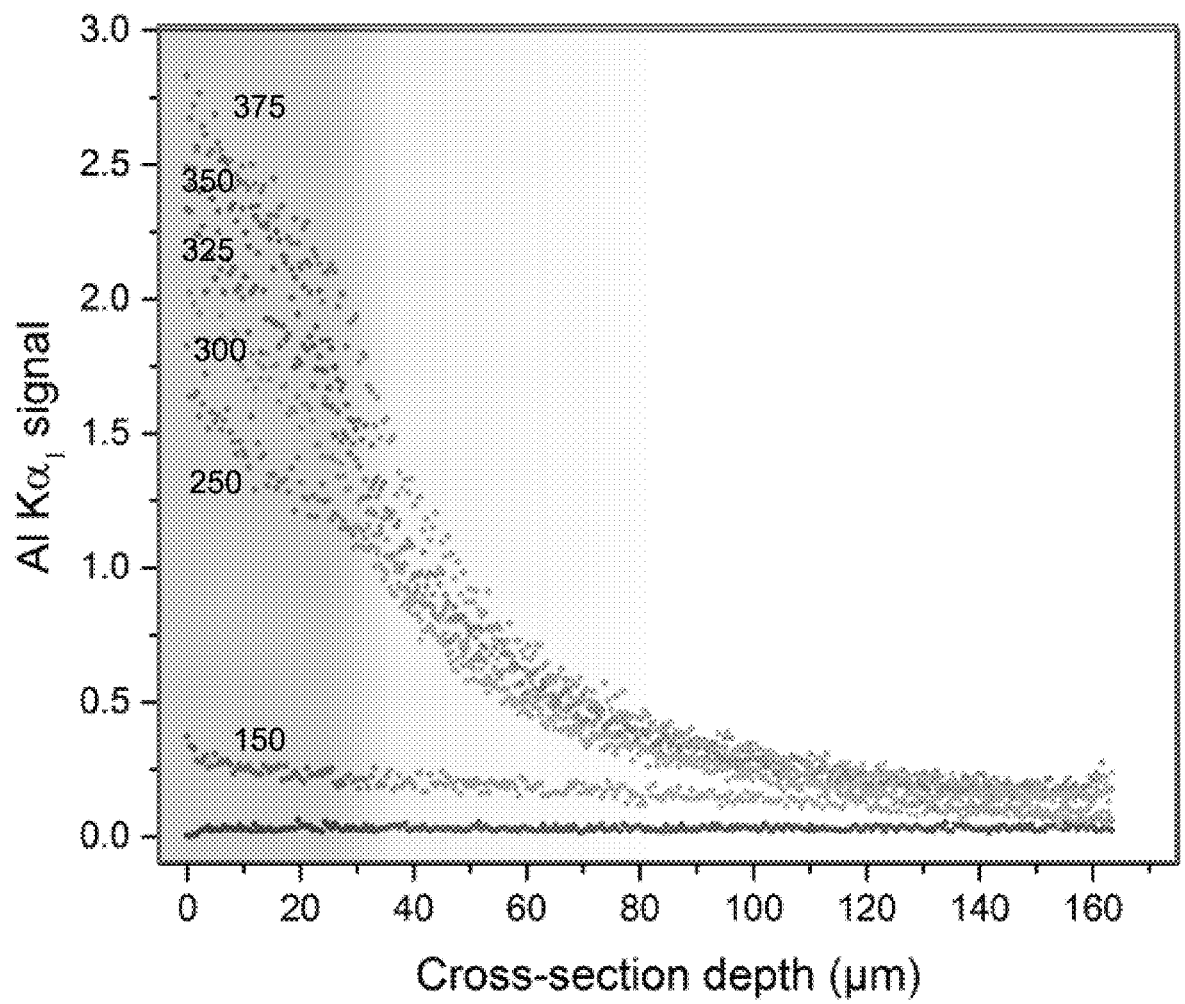
Figure 2D:
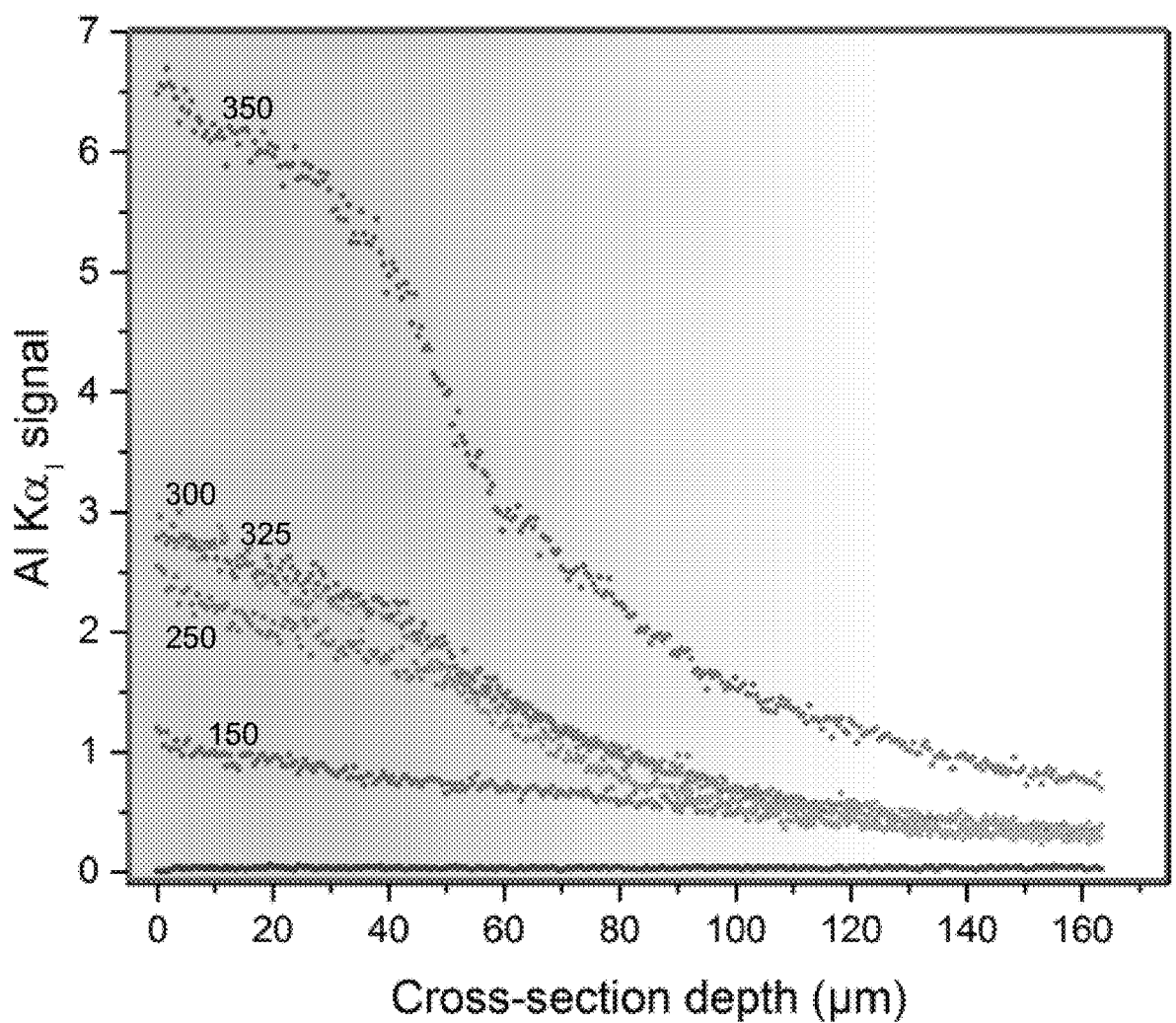
Figure 11A:
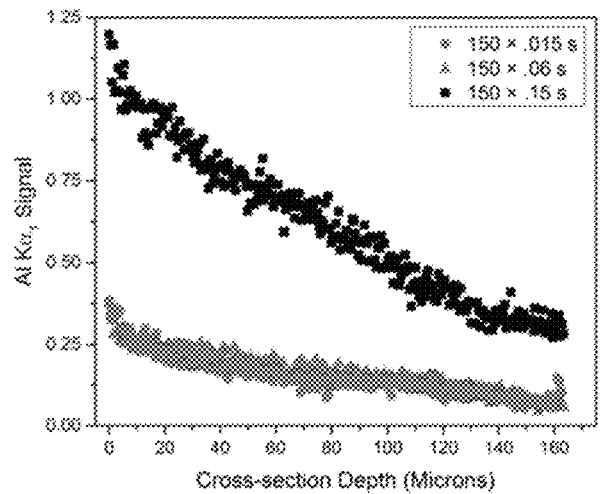
Figure 11B:
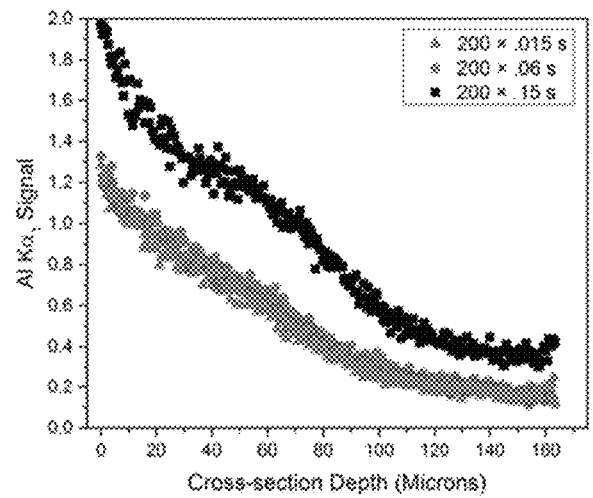
Figure 11C:
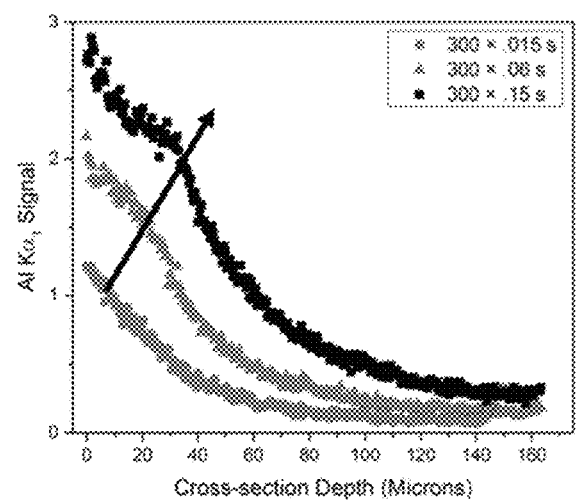

With these principles in mind, we performed EDS measurements of the Al signals of Janus membranes to assess the extent of $Al_2O_3$ penetration through the membranes. FIG. 2A shows an EDS Al signal map for one of the Janus membranes in cross-section superimposed on the corresponding SEM image. It is evident that the Al concentration is higher on the modified surface side of the membrane. FIGS. 2B, 2C, and 2D show depth profiles derived from EDS Al signal precursor exposures dosages of 0.015, 0.06, and 0.15 seconds, respectively and varying cycle number. In all cases, the Al concentration is greatest at the pore entrance and decreases with depth into the membrane, and the extent of infiltration increases with increasing exposure, as indicated by the yellow shaded regions in these graphs. Moreover, the magnitude of the Al signals increases with increasing $Al_2O_3$ ALD cycles. FIG. 11A shows these profiles plotted for a given number of cycles across vapor exposures.

The EDS linescans in FIG. 4 exhibit two distinct regimes as a function of ALD cycles. At low cycle numbers of ~150-250 cycles, the profiles are fairly flat and show only a small gradual decrease in concentration with depth into the membrane. Above ~300 cycles, however, the EDS profiles exhibit a step-like profile where the coverage is much higher at the pore entrance than deeper in the pore. Once this transition occurs, the profile shapes do not change much with increasing ALD cycles other than to increase in magnitude. In addition, all of the profiles at a given exposure converge deep within the membrane so that all of the curves are essentially superimposed. The data also exhibit a region near the pore entrance where the coverage profile becomes qualitatively linear, as indicated by the shaded bars above FIGS. 2B, 2C, and 2D.

These two regimes may be explained by a gradient in TMA reactivity along the pores that sets up in the low-cycle limit. The polypropylene membranes have an AR of ~800 (neglecting tortuosity), and for the reaction of TMA on $Al_2O_3$ $\beta_0$ ~$10^{-2}$ so $\alpha$~$10^4$. Consequently, the stepped coverage profiles are expected once the ALD $Al_2O_3$ forms on closed and continuous film on the polypropylene surface. The gradual coverage profiles for the initial cycles suggest $\alpha<10$, so that $\beta_0<10^{-5}$. This is indicative of the extremely low reaction rate for TMA on bare polypropylene. Once the $Al_2O_3$ nuclei grow to sufficient size at the pore entrance, the much higher reaction rate for TMA on $Al_2O_3$ dominates the slow diffusion into high AR pores, and all of the TMA is consumed at the pore entrance. Thus, the reactivity gradient persists throughout the coating process, and the Al concentration deep in the pores no longer increases.

Additional experiments correlated the depth of the ALD $Al_2O_3$ infiltration into the membranes with depth to which wetting behavior is modified. Janus membranes were prepared using 350 ALD cycles using precursor exposures of 0.015, 0.03, 0.06, and 0.15 seconds and ten second purges. The modified surfaces of these membranes were placed in contact with a solution of blue dye for one hour to allow for capillary action to wick the solution into the membrane porosity. The membranes were rinsed and dried thoroughly, prepared in cross-section, and examined by optical microscopy as shown in FIG. 2E. With increasing precursor exposure, the position of the dye interface moved deeper into the membrane. At the lowest exposure of 0.015 seconds, the solution was imbibed approximately 4 microns into the membrane. At the highest exposure of 0.15 seconds, the solution was imbibed approximately 16 microns into the membrane. The increased depth of the dye front by capillary rise shows that the position of internal Janus interface can be tuned.

Janus Membrane Wettability
Water Contact Angle Measurements

Figure 3A:
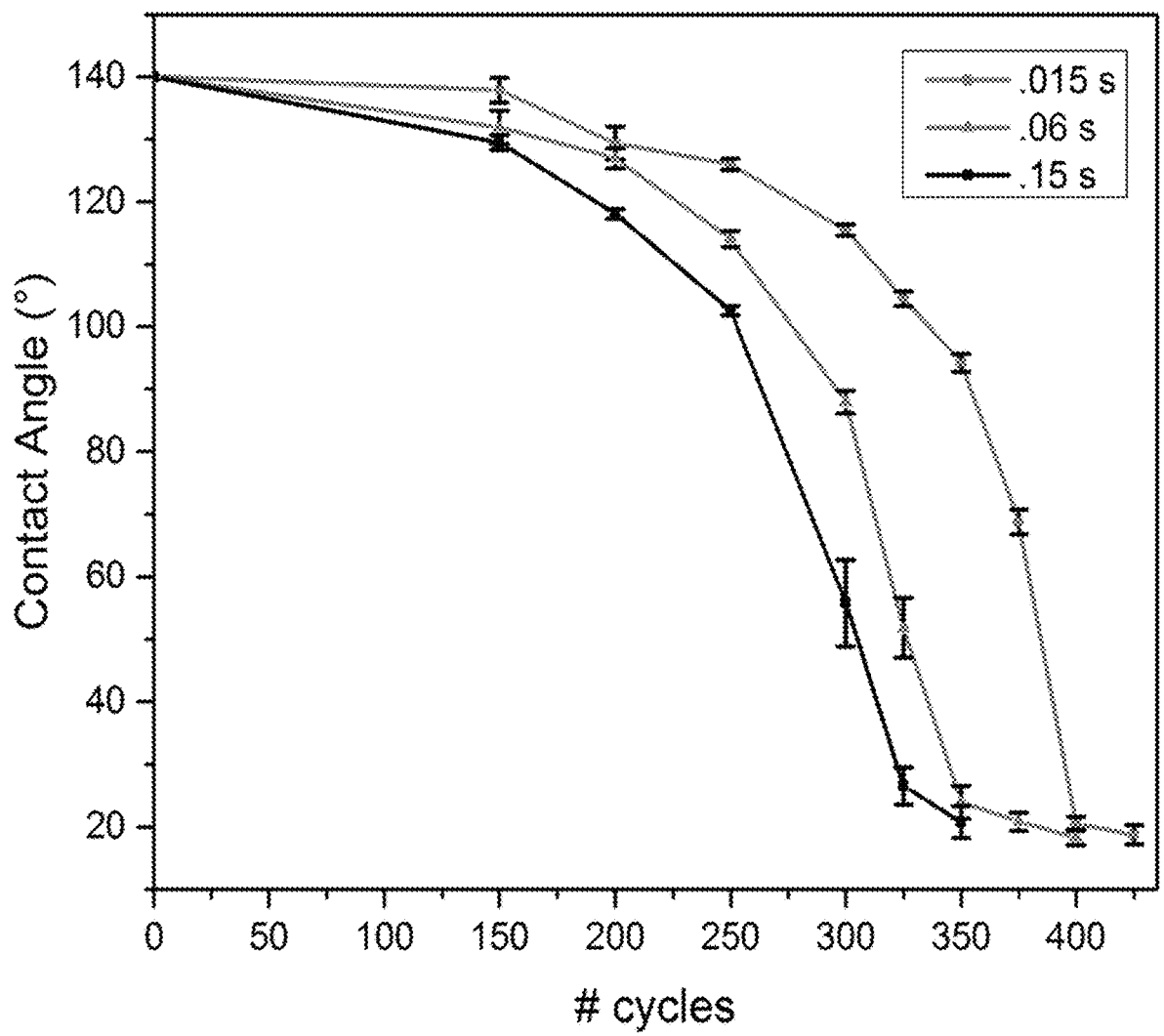
FIG. 3A is a graph showing contact angle as a function of vapor exposure and number of ALD cycles.
Figure 3B:
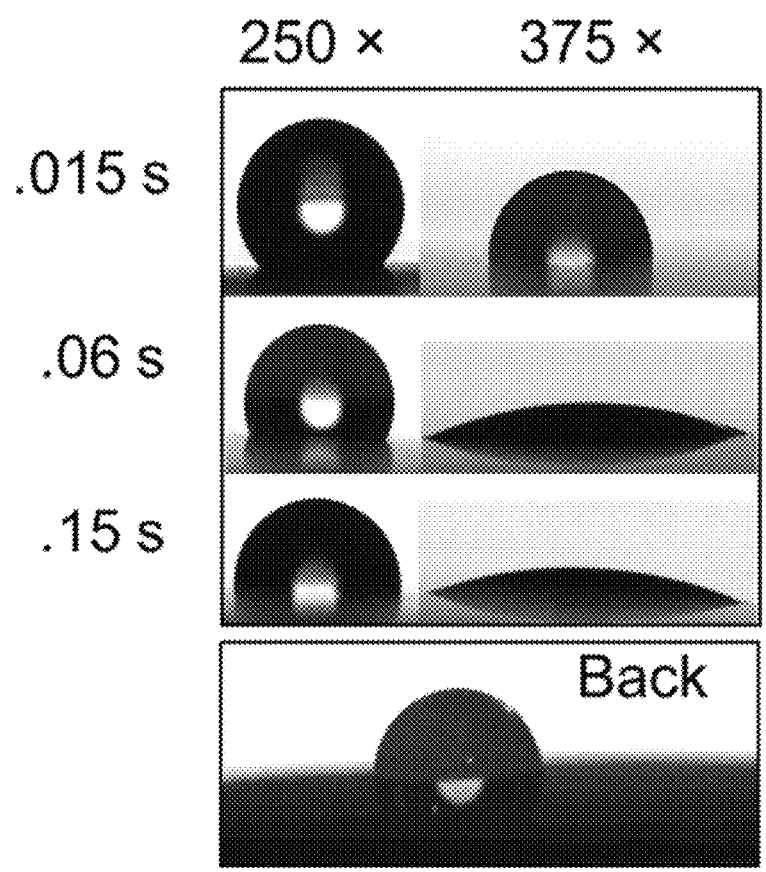
FIG. 3B shows representative images across vapor pressures for 250 cycles and 375 cycles. A droplet on the back of the membrane confirms the Janus nature of the deposition.

To study the evolution of the modified membrane surface wetting properties, contact angle measurements were conducted at different ALD cycle numbers and vapor exposures. These measurements were conducted as soon as possible after removal from the ALD chamber, to limit the influence of environmental residue adsorption. Contact angles were recorded as the first stable frame after bringing a 1.0 µL drop into contact with the membrane surface. The plotted contact angle values are the average of at least seven drops per membrane, and there was no significant variation observed in any direction along the exposed, functionalized face. FIG. 3A shows that by increasing the number of ALD cycles, the contact angle of the functionalized surface decreases gradually over the initial 250 cycles, and then drops rapidly with increasing cycles. The onset of hydrophilicity occurs at a lower number of cycles as the exposure dose is increased. This follows from the more rapid onset of nucleation and growth with higher exposure dose observed in surface SEM. The back side of the membrane exhibited a contact angle of over 130° on all membranes, demonstrating a marked Janus property.

Figure 3C:
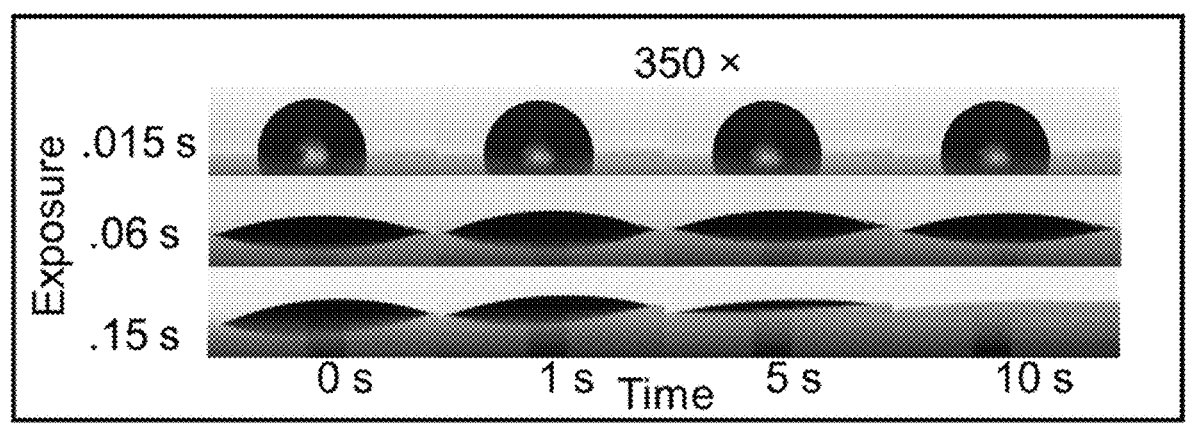
FIG. 3C shows images demonstrating drop imbibition across vapor pressures and 350 cycles as a function of time and for different vapor exposures of 0.015 s, 0.06 s, and 0.15 s. In one embodiment, significant imbibition at 350 cycles only occurs with a 0.15 second vapor exposure.

The wetting behavior on these porous substrates is an indirect measure of the surface energy due to the porosity and roughness of the materials. Though the initial contact angle decreased for each of the tested precursor exposure levels, drop imbibition into the porosity of the membrane differed. At 0.015 seconds, no complete imbibition was observed even at the highest cycle number tested. At 0.06 seconds, complete imbibition began at 375 cycles, and at 0.15 seconds complete imbibition began at 325 cycles. Representative stills from 350 cycles are demonstrated in FIG. 3C. The transition from drop spreading on the hydrophilized surface to significant imbibition by the functionalized surface may be thought of as a transition between a Cassie-Baxter state to a Wenzel state. In the Cassie-Baxter state, the pore surface suspends an air-water interface. As the number of cycles is increased, the surface area fraction of $Al_2O_3$ increases, along with the roughness and extent of $Al_2O_3$ coverage. These factors destabilize the air-water interface at the pore surface, and the water begins to preferentially wick into the pore interior.

To probe the influence of purge time on wettability, Janus membranes were fabricated using 350 ALD $Al_2O_3$. cycles with precursor exposures of 0.015, 0.06, 0.15 seconds and purge times of 10, 30, and 65 seconds. As shown in FIG. 3E, the average contact angles measured for these membranes increased with increasing purge time, indicating a decrease in wettability. We hypothesize that the longer purge times allow the TMA physisorbed in to the polypropylene surface to desorb, which reduces the rate of $Al_2O_3$ nucleation.

Lateral Membrane Modification

Physical masking of the membrane to limit precursor exposure to one side of the membrane during the ALD modification also enables spatial patterning of hydrophilic/hydrophobic regions on the exposed side of the membrane.

Figure 4A:
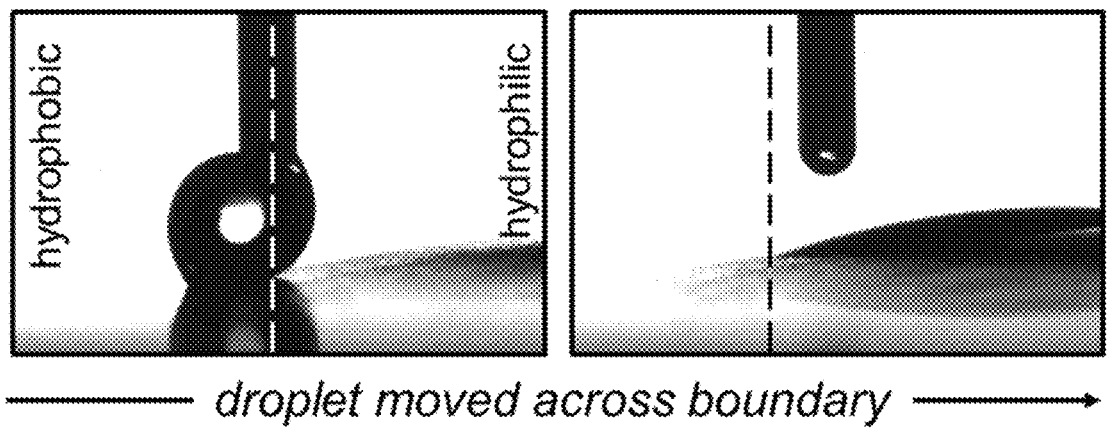
FIG. 4A shows a water drop brought into contact with covered portion of the unmodified membrane surface is manipulated laterally with the needle to the $Al_2O_3$-modified region of one embodiment, at which point the water droplet rapidly spreads and is imbibed by the Janus membrane.
Figure 4B:
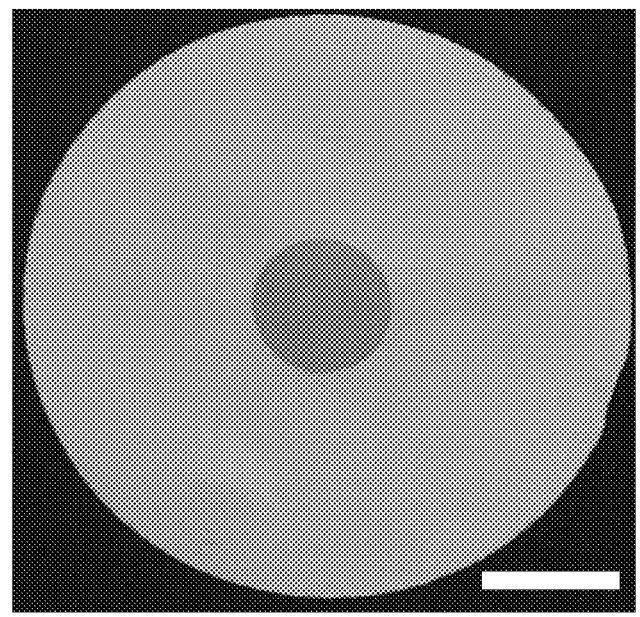
FIG. 4B shows staining with Coomasie Blue dye revealing the lateral pattern of the Janus modification in one embodiment, scale bar is 10 mm.
Figure 4C:
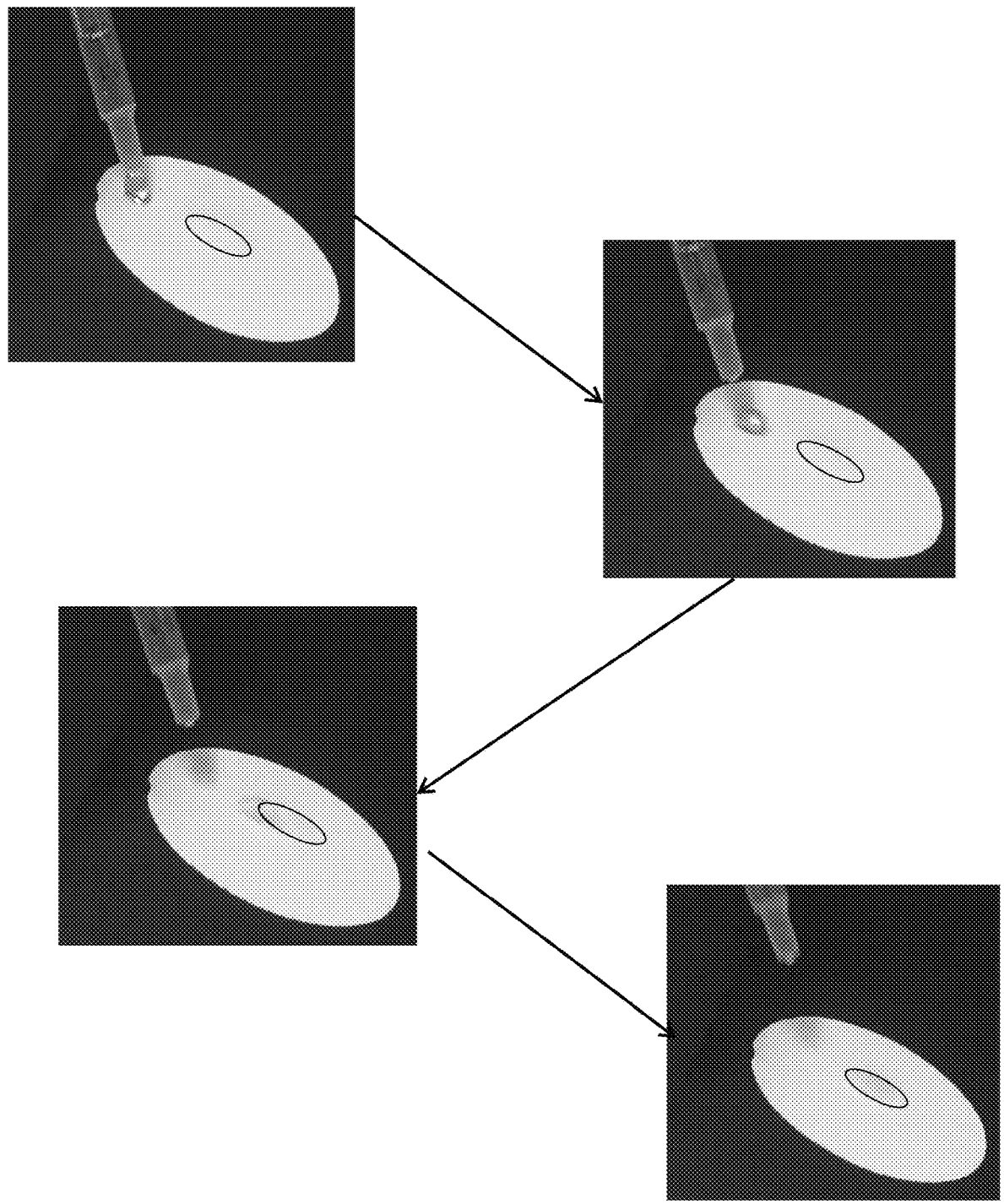
FIG. 4C shows a series of photographs wherein a water droplet deposited on an inclined Janus membrane rolls on the unmodified hydrophobic region (left two frames) only to be immobilized by a 10 mm Janus-modified region (right two frames).
Figure 6A:
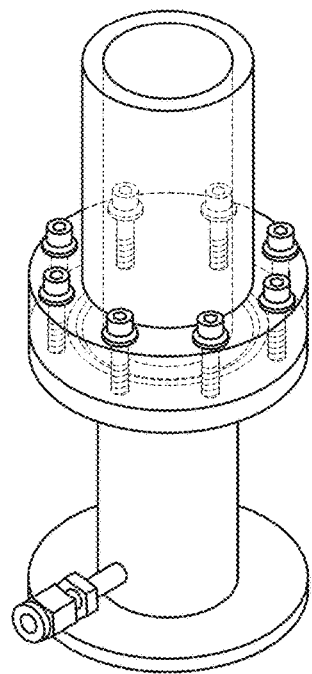
FIG. 6A illustrates one embodiment of an aeration apparatus.
Figure 6B:
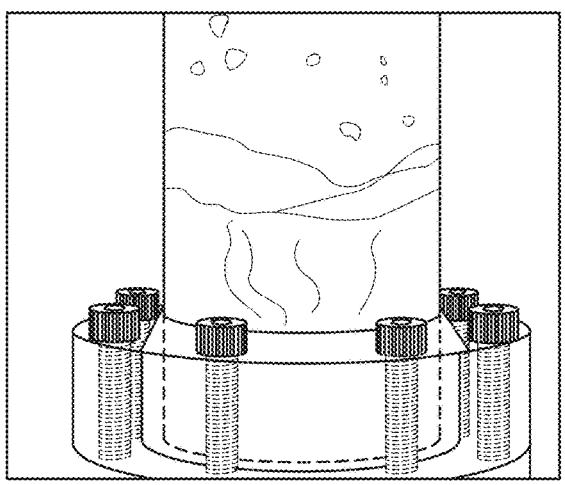
FIGS. 6B and 6C are still images extracted from videos of aeration using a pristine polypropylene membrane (FIG. 6B) and a Janus membrane (FIG. 6C) prepared with 300 cycles at 0.015 second vapor exposure. The large bubbles emerging from the unmodified surface contrast dramatically with the millimeter-scale bubbles that release from the Janus surface.
Figure 6C:
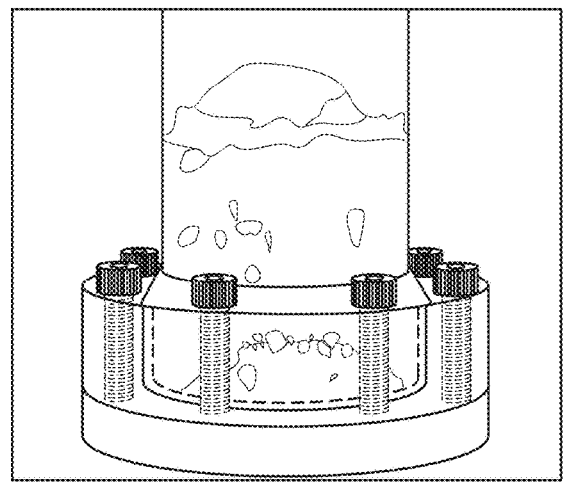

FIG. 4A shows a water droplet deposited on the shielded hydrophobic region and dragged onto the hydrophilic region of the front face of a Janus membrane (400 cycles, 0.015 second exposures, 10 second purges). The drop abruptly spread and was imbibed as soon as the leading edge came into contact with the $Al_2O_3$-functionalized surface. The ability to laterally pattern the modification is further demonstrated in FIG. 4B, in which the membrane was submerged in Coomassie Blue solution. In this instance, the membrane was set in a housing that only exposed a central 10 mm diameter region of the membrane to the precursor flux. This mask faithfully templated a hydrophilic region to the exposed area only. Lastly, another membrane Janus membrane with a 10 mm modified spot was placed on a 30° inclined plane, and water was dropped onto the surface (FIG. 4C) Water droplets rolled down the unmodified, hydrophobic polypropylene but were abruptly stopped and imbibed by the hydrophilized spot.

Beyond the direct utility of the functionalized $Al_2O_3$ surface for its wetting properties, the spatially modified $Al_2O_3$ surface can be used as a platform to further modify one side of the membrane with molecules that preferentially graft onto the Al—OH hydroxyl groups created by the $Al_2O_3$ ALD. Recently, porous polyurethane was modified with sequential infiltration synthesis $Al_2O_3$, which served to activate the surface for the subsequent grafting of trimethylsilane-terminated superoleophilic molecules to enable high-capacity, reusable crude oil sorbents. Diffusion-limited ALD Janus membranes can therefore introduce spatially-resolved reactive surface sites on otherwise unreactive polymer membranes for further functionalization.

These spatially-resolved hydrophilic zones imply possible paper-based microfluidic applications for ALD-derived Janus membranes. Paper microfluidics are an expansive research area in which fluids are passively transported through hydrophilic porous materials such as cellulose through channels defined by hydrophobic modifications. These hydrophobic modifications are applied by direct printing techniques, and recently by masked vapor deposition of hydrophobic silanes. The hydrophilic cellulose hydroxyl groups can serve as binding sites for a host of functional molecules that react with species in fluids of interest for applications in sensing and diagnostics. In the ALD-derived Janus material, the tone of the modification would be inverted, such that exposed areas become the hydrophilic paths for fluid manipulation with surface-terminated hydroxyls for functionalization.

Air Contact Angle Measurements

The gas contact angle of the membranes were next measured to assess air adhesion as a function of the Janus modification. Distilled water was used as the fluid medium, and air bubbles were brought into contact with the modified surface, which was affixed to a glass slide to ensure complete submersion. The membrane was prewetted with ethanol to mitigate the impact of air trapped in aerophilic samples.

Figure 3D:
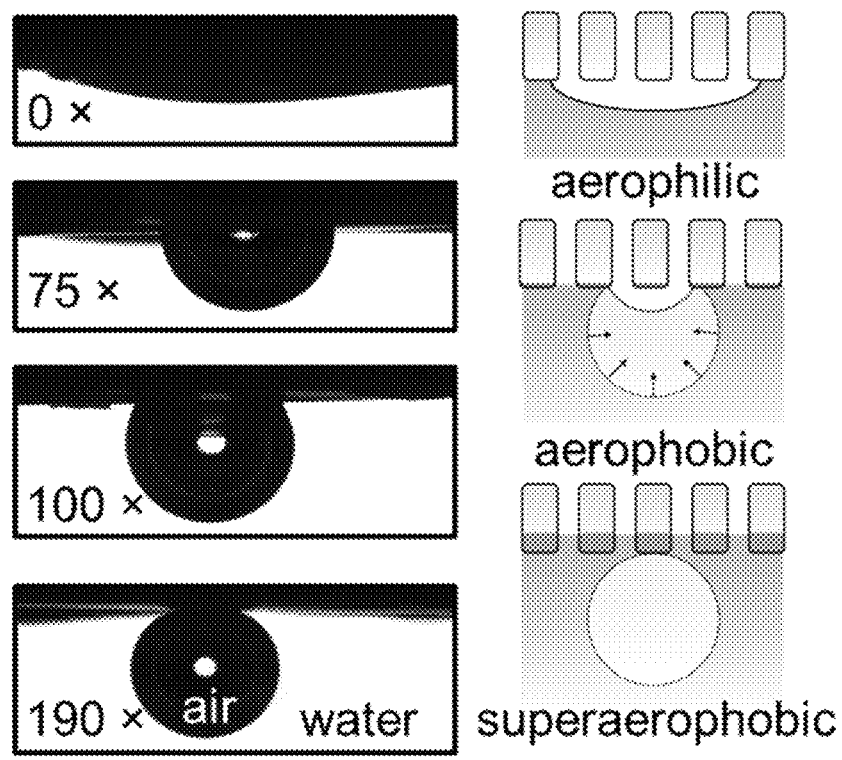
FIG. 3D shows under water air contact angle measurements indicating a progression from aerophilic to aerophobic Janus surface and a superaerophobic transition at ~190 cycles and 0.015 second vapor exposure.
Figure 3E:
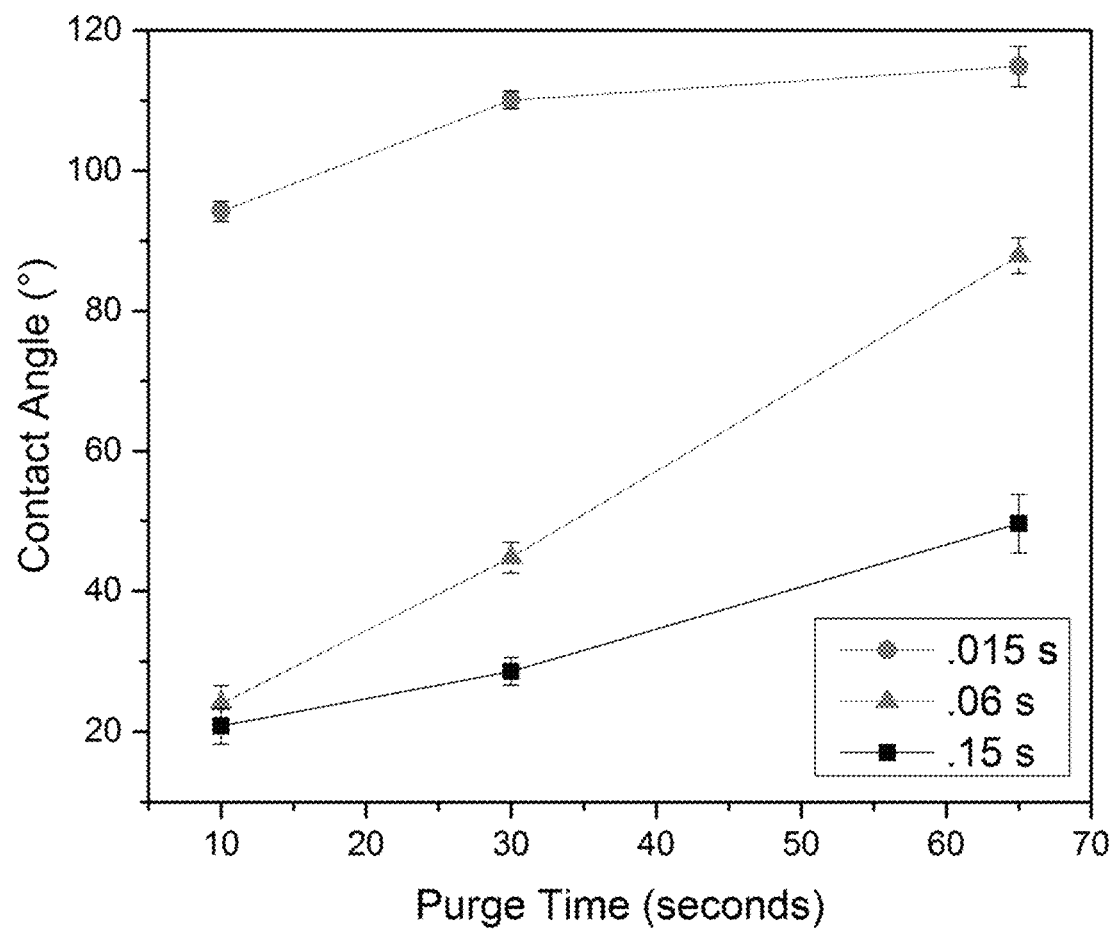
FIG. 3E is a graph illustrating contact angle as a function of purge time for 350 cycle membranes across vapor exposures. A decrease in hydrophilic gain per cycle with greater purge time is observed across vapor exposures.

FIG. 3D shows the underwater air-contact angle of membranes modified with 0-190 ALD $Al_2O_3$ cycles using 0.015 s precursor exposures. The pristine membrane shows complete spreading of the air bubble. Much as in the case of the water contact angle measurements, the membrane became more aerophobic with increasing numbers of ALD cycles. The air bubble contact angle reached approximately 90° with only 75 ALD cycles and 120° with 125 ALD cycles. A high contact angle exceeding 140° degrees was observed beyond 175 ALD cycles. An apparent transition in air adhesion was observed in the vicinity of 190 ALD cycles. Below this threshold, the bubble exhibited an extremely high contact angle but was pinned in place at its contact line. An air bubble pinned to the syringe tip used to deliver the air could be coaxed onto the membrane by making contact. Above this threshold, the bubble was extremely mobile on the surface. An air bubble pinned to the syringe tip could not be coaxed onto the membrane surface, even when pushed against the modified surface. The bubble had to be released from the syringe to observe the mobile sliding behavior. The membrane surface is described as transitioning from aerophobic to superaerophobic in nature. The superaerophobic phenomena emerges from the hydrophilicity of the $Al_2O_3$ in combination with the hierarchical roughness of the polypropylene's porosity and the roughness of the deposited $Al_2O_3$. This phenomenology is illustrated in FIG. 3D. It is hypothesized that the aerophobic condition observed below 190 cycles occurs when the air interface encounters a heterogenous membrane surface composed of discrete $Al_2O_3$ nuclei and some remaining polypropylene. The presence of the hydrophilic nuclei gives rise to the apparent aerophobic contact angles. Above the threshold of superaerophobicity, the air bubble contacts a conformal $Al_2O_3$ surface with sufficient coverage that it cannot pin on the surface, and instead slides easily.

Diode-like unidirectional fluid transport has been described in a number of Janus membrane systems. This unusual behavior emerges from the wetting asymmetry—an aqueous drop placed on the hydrophobic side will flow through the pores due to the Laplace pressure of its high contact angle, whereas a drop on the hydrophilic side spreads and does not have any driving force to move all the way through the membrane.

Janus Membrane Aeration

As a demonstration of the utility of the ALD-derived Janus membranes, aeration experiments were conducted on a pristine polypropylene membrane and a Janus membrane (300 cycles, 0.015 second exposure, 10 second purge). The experiment consists of a custom built bubbler (FIG. 3C) in which gas can be flowed through the membrane into a column of water. Aeration is a critical dispersion process for the transfer of gases to dissolve into liquids. Aeration is widely used in industrial chemical synthesis, aquaculture, $CO_2$ capture, and wastewater treatment. The dissolution rate of gases into the liquid is enhanced by shrinking the size of the bubbles. This fact is based on surface area-volume scaling. At the same flow rate, there is far more surface area for gas diffusion if the volume of gas is distributed over many bubbles. As an ancillary effect, the duration of the bubble residence in the liquid increases as the bubble shrinks. The rate of the bubble's rise through a liquid due to buoyancy can be given by Stokes' equation in Equation 2:

$$v = \frac{\Delta \rho_{lg}}{18\mu} g d^2 \qquad (2)$$

Here v is the velocity of the bubble upwards, $\Delta \rho_{lg}$ is the density difference between the liquid and gas, $\mu$ is the viscosity of the liquid, g is the acceleration of gravity, and d is the diameter of the bubble.

In an aeration process, gas is forced through the membrane and gathers in bubbles, which eventually release from the surface. Bubble release occurs when the buoyant force of the forming air bubble exceeds the adhesion force between the bubble and membrane surface. Minimizing the adhesion will therefore lower the minimum bubble size that can be released. Though hydrophilic surfaces may seem ideal in this sense, a completely wetting membrane will require a significant pressure to displace the water from the pore interiors. A Janus membrane with a thin hydrophilic skin layer is therefore ideal, as the site of poor gas adhesion is limited to the near-immediate surface and the pressure loss across the thickness of the membrane is minimized. The adhesion can be further minimized by superaerophobicity deriving from the roughness of the material. The illustration in FIGS. 5A-5C demonstrates the difference between the hydrophobic unmodified membrane and the modified Janus membrane. In the case of the unmodified membrane, the air spreads over the polypropylene surface as a film and is released in large bubbles. In the case of the superaerophobic membrane, the bubbles are much smaller and release individually. The adhesion force of the bubble to the membrane surface is related to the area in contact with the membrane and is therefore proportional to $\sin(\theta)$. Aeration performed at a pressure of 1 psi on the pristine membrane and a Janus membrane prepared with 300 cycles of ALD at 0.015 second vapor exposure show the drastic difference in aeration performance. It was observed that the fine bubble release due to the $Al_2O_3$ skin of the Janus membrane compared to the large bubbles of the pristine membrane.

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

As used herein, the terms "about" and "approximately" generally mean plus or minus 10% of the stated value. For example, about 0.5 would include 0.45 and 0.55, about 10 would include 9 to 11, about 1000 would include 900 to 1100.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A method of fabricating a Janus membrane comprising:
    positioning a membrane in a housing in an Atomic Layer Deposition (ALD) reactor, the membrane having a first side and a second side and comprising a material, the membrane positioned within the housing with the entire second side disposed on and physically masked from precursor exposure by a portion of the housing and the first side exposed to a reaction chamber of the ALD reactor, wherein the membrane lacks polar functional groups; and
    depositing an oxide coating on the first side of the membrane and within a network of pores within the membrane by performing at least 150 cycles of atomic layer deposition, wherein a cycle of the at least 150 cycles comprises the steps of:
        exposing a first ALD precursor flux comprising a first ALD precursor at a first deposition temperature, a first vapor pressure, and for a first exposure time;
        absorbing the first ALD precursor to the first side of the membrane and within a portion of the network of pores;
        a purge step, after absorbing the first ALD precursor, comprising a pulse of inert gas for purge time of between 10 seconds and 60 seconds;
        after the purge step, exposing a second ALD precursor flux comprising water at a second deposition temperature, a second vapor pressure, and for a second exposure time;
        reacting the absorbed first ALD precursor with the second ALD precursor; and
        forming a coating on the first side and the portion of the network of pores;
        wherein flow of the first ALD precursor in the network of pores is governed by Knudsen diffusion; and
    wherein the deposition of the oxide coating forms a uniform thickness on the first side and a thickness gradient of oxide coating within the network of pores and further wherein the second side is free of the oxide coating.

2. The method of claim 1, wherein the membrane is polypropylene.

3. The method of claim 1, wherein the first ALD precursor is an organometallic precursor.

4. The method of claim 1, wherein the network of pores is tortuous.

5. The method of claim 1, wherein the second ALD precursor is water.

6. The method of claim 1, wherein the housing comprises a fixture and a masking plate, the fixture engageable with the masking plate and the membrane retained within the housing.

7. The method of claim 1, wherein the first deposition temperature is between 60° C. and 110° C.

8. The method of claim 1, wherein the first vapor pressure is up to 1 Torr.

9. A method of fabricating a membrane comprising:
positioning a membrane lacking polar functional groups in a housing in an Atomic Layer deposition (ALD) reactor, the membrane having a first side and a second side, so that the second side of the membrane is disposed on and physically masked from precursor exposure by a portion of the housing; and
depositing an oxide on the first side of the membrane and within a network of pores within the membrane by atomic layer deposition by the steps of:
performing an ALD cycle of:
exposing a first ALD precursor flux comprising a first ALD precursor at a first deposition temperature, a first vapor pressure, and for a first exposure time;
absorbing the first ALD precursor to the first side of the membrane and within a portion of the network of pores;
exposing a second ALD precursor flux comprising a second ALD precursor at a second deposition temperature, a second vapor pressure, and for a second exposure time;
reacting the absorbed first ALD precursor with the second ALD precursor; and
forming a plurality of oxide seeds on the first side and the portion of the network of pores,
wherein the ALD cycle is repeated 100 to 300 times; and
wherein the oxide within the network of pores has a monotonically decreasing thickness gradient with increasing pore depth.

10. The method of claim 9, wherein the membrane is polypropylene.

11. The method of claim 9, wherein the coating is an oxide and wherein the first ALD precursor is an organometallic precursor.

12. The method of claim 9, wherein the network of pores is tortuous.

13. The method of claim 9, wherein the second ALD precursor is water.

14. The method of claim 9, wherein exposing the second precursor flux occurs immediately after exposing the first precursor flux without an intervening purge step.

* * * * *